(12) United States Patent
Baek

(10) Patent No.: US 11,509,807 B2
(45) Date of Patent: Nov. 22, 2022

(54) ELECTRONIC DEVICE AND METHOD FOR GENERATING THUMBNAILS BASED ON CAPTURED IMAGES

(71) Applicant: Samsung Electronics Co., Ltd., Suwon-si (KR)

(72) Inventor: Woo-Hyun Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/859,963

(22) Filed: Apr. 27, 2020

(65) Prior Publication Data

US 2020/0255350 A1    Aug. 13, 2020

Related U.S. Application Data

(63) Continuation of application No. 16/505,400, filed on Jul. 8, 2019, now Pat. No. 10,633,296, which is a (Continued)

(30) Foreign Application Priority Data

Mar. 3, 2014    (KR) .......................... 10-2014-0025000

(51) Int. Cl.
*H04N 5/225*     (2006.01)
*E01C 7/00*      (2006.01)
(Continued)

(52) U.S. Cl.
CPC .......... *H04N 5/2258* (2013.01); *B01J 21/063* (2013.01); *B01J 35/004* (2013.01);
(Continued)

(58) Field of Classification Search
CPC ............. H04N 5/23293; H04N 5/2258; H04N 2201/325; H04N 5/232935;
(Continued)

(56) References Cited

U.S. PATENT DOCUMENTS 7,227,576 B2    6/2007 Umeyama
7,337,344 B2    2/2008 Barman et al.
(Continued)

FOREIGN PATENT DOCUMENTS

CN    1554183 A    12/2004
CN    101420504 A    4/2009
(Continued)

OTHER PUBLICATIONS

International Search Report dated Jun. 9, 2014 in connection with International Patent Application No. PCT/KR2014/002091; 3 pages.
(Continued)

*Primary Examiner* — Nicholas G Giles

(57) ABSTRACT

An electronic device includes a first image sensor, a second image sensor, one or more image processing modules, and a display. The first image sensor generates first image data. The second image sensor generates second image data. The one or more image processing modules process one or more image data among the first image and the second image data. The display displays the one or more image data among the first image data or second image data processed by the one or more image processing modules. The thumbnail generation module generates thumbnail data using the one or more image data among the first image data and second image data processed by the one or more image processing modules. A method includes converting the plurality of image data into a format displayable on a display, and generating thumbnail data using the image data of the displayable format.

9 Claims, 15 Drawing Sheets

Related U.S. Application Data continuation of application No. 15/469,321, filed on Mar. 24, 2017, now Pat. No. 10,348,971, which is a continuation of application No. 14/210,115, filed on Mar. 13, 2014, now Pat. No. 9,635,268.

(60) Provisional application No. 61/780,635, filed on Mar. 13, 2013.

(51) Int. Cl.

| | | |
|---|---|---|
| B01J 21/06 | (2006.01) | |
| B01J 35/00 | (2006.01) | |
| E01C 7/35 | (2006.01) | |
| E01C 1/00 | (2006.01) | |
| H04N 5/232 | (2006.01) | |
| H04N 1/32 | (2006.01) | |
| C04B 41/50 | (2006.01) | |
| H04N 5/262 | (2006.01) | |
| H04N 101/00 | (2006.01) | |

(52) U.S. Cl.
CPC .......... *C04B 41/5041* (2013.01); *E01C 1/005* (2013.01); *E01C 7/00* (2013.01); *E01C 7/353* (2013.01); *E01C 7/358* (2013.01); *H04N 1/32106* (2013.01); *H04N 5/23232* (2013.01); *H04N 5/23293* (2013.01); *H04N 5/232935* (2018.08); *H04N 5/2621* (2013.01); *H04N 2101/00* (2013.01); *H04N 2201/0008* (2013.01); *H04N 2201/325* (2013.01)

(58) Field of Classification Search
CPC .......... H04N 1/32106; H04N 5/23232; H04N 5/2621; H04N 2101/00
See application file for complete search history.

(56) References Cited

U.S. PATENT DOCUMENTS

| | | | |
|---|---|---|---|
| 7,511,764 B2 | 3/2009 | Cooper et al. | |
| 7,725,837 B2 | 5/2010 | Wong et al. | |
| 8,199,222 B2 | 6/2012 | Drimbarean et al. | |
| 8,253,807 B2 | 8/2012 | Hatanaka | |
| 8,549,435 B1 | 10/2013 | Bushore et al. | |
| 8,576,428 B2 | 11/2013 | Nitta | |
| 8,774,287 B2 | 7/2014 | Hardy et al. | |
| 9,635,268 B2 | 4/2017 | Baek | |
| 10,348,971 B2 | 7/2019 | Baek | |
| 2001/0033303 A1* | 10/2001 | Anderson | G06F 16/532 715/854 |
| 2002/0057473 A1 | 5/2002 | Umeyama | |
| 2003/0090504 A1 | 5/2003 | Brook et al. | |
| 2004/0017486 A1 | 1/2004 | Cooper et al. | |
| 2004/0187044 A1 | 9/2004 | Barman et al. | |
| 2005/0047672 A1 | 3/2005 | Ben-Ezra et al. | |
| 2006/0187227 A1 | 8/2006 | Jung et al. | |
| 2006/0224993 A1 | 10/2006 | Wong et al. | |
| 2007/0109411 A1 | 5/2007 | Jung et al. | |
| 2007/0236593 A1 | 10/2007 | Yu | |
| 2008/0030592 A1* | 2/2008 | Border | H04N 5/23296 348/218.1 |
| 2008/0166114 A1 | 7/2008 | Engstrom | |
| 2009/0110330 A1 | 4/2009 | Yen | |
| 2009/0185039 A1 | 7/2009 | Hatanaka | |
| 2010/0033582 A1 | 2/2010 | Maeng et al. | |
| 2010/0118175 A1 | 5/2010 | Bruce | |
| 2010/0118338 A1 | 5/2010 | Sakiyama et al. | |
| 2010/0245906 A1 | 9/2010 | Nitta | |
| 2010/0258971 A1 | 10/2010 | Sun | |
| 2010/0321470 A1 | 12/2010 | Oshima | |
| 2011/0164178 A1 | 7/2011 | Hardy et al. | |
| 2011/0285862 A1 | 11/2011 | Kim et al. | |
| 2011/0298948 A1 | 12/2011 | Park et al. | |
| 2012/0120186 A1 | 5/2012 | Diaz et al. | |
| 2012/0120256 A1 | 5/2012 | Hwang et al. | |
| 2012/0133817 A1 | 5/2012 | Anderson | |
| 2012/0172086 A1 | 7/2012 | Choi et al. | |
| 2013/0021447 A1 | 1/2013 | Brisedoux et al. | |
| 2013/0050519 A1 | 2/2013 | Lee et al. | |
| 2014/0160233 A1 | 6/2014 | Ishida | |
| 2014/0240504 A1 | 8/2014 | Cho | |
| 2014/0267871 A1 | 9/2014 | Baek | |
| 2014/0362251 A1 | 12/2014 | Anderson | |

FOREIGN PATENT DOCUMENTS

| | | | |
|---|---|---|---|
| CN | 101742035 A | 6/2010 | |
| CN | 102255949 A | 11/2011 | |
| CN | 102289781 A | 12/2011 | |
| CN | 102467341 A | 5/2012 | |
| CN | 102546925 A | 7/2012 | |
| CN | 102915669 A | 2/2013 | |
| EP | 2343845 A2 | 7/2011 | |
| JP | 2002051241 A | 2/2002 | |
| JP | 2006121229 A | 5/2006 | |
| KR | 10-2007-0097249 A | 10/2007 | |
| KR | 10-2008-0006774 A | 1/2008 | |
| KR | 10-2008-0006774 A1 | 1/2008 | |
| KR | 10-2009-0072556 A | 7/2009 | |
| KR | 10-2010-0018335 A | 2/2010 | |
| KR | 10-2010-0032135 A | 3/2010 | |
| KR | 10-2010-0087954 A | 8/2010 | |
| KR | 10-0992109 B1 | 11/2010 | |
| KR | 10-2011-0121103 A | 11/2011 | |
| KR | 10-2013-0011951 A | 1/2013 | |
| KR | 10-2013-0016037 A | 2/2013 | |
| KR | 10-2013-0016076 A | 2/2013 | |
| KR | 10-2013-0016077 A | 2/2013 | |
| KR | 10-2013-0016105 A | 2/2013 | |
| KR | 10-2013-0016145 A | 2/2013 | |
| KR | 10-2013-0016383 A | 2/2013 | |
| KR | 10-2013-0016418 A | 2/2013 | |
| KR | 10-2013-0017047 A | 2/2013 | |
| KR | 10-1228349 B1 | 2/2013 | |
| KR | 10-1231869 B1 | 2/2013 | |
| KR | 10-1232317 B1 | 2/2013 | |
| KR | 10-1233608 B1 | 2/2013 | |
| KR | 10-1233689 B1 | 2/2013 | |
| KR | 10-1233709 B1 | 2/2013 | |
| KR | 10-1233793 B1 | 2/2013 | |
| KR | 10-1234350 B1 | 2/2013 | |
| KR | 10-1234356 B1 | 2/2013 | |
| KR | 10-1234769 B1 | 2/2013 | |
| KR | 10-1234770 B1 | 2/2013 | |
| KR | 10-1234917 B1 | 2/2013 | |
| WO | 9903264 A1 | 1/1999 | |
| WO | 2008016474 A2 | 2/2008 | |
| WO | 2012064672 A1 | 5/2012 | |

OTHER PUBLICATIONS

Written Opinion of International Searching Authority dated Jun. 9, 2014 in connection with International Patent Application No. PCT/KR2014/002091; 6 pages.

Extended European Search Report dated Jul. 3, 2014 in connection with European Patent Application No. 14159485.3; 9 pages.

European Examination Report dated Sep. 19, 2016 in connection with European Application No. 14159485.3, 5 pages.

Office Action dated Jan. 21, 2021 in connection with Chinese Patent Application No. 201911355618.9, 17 pages.

Summons to attend oral proceedings pursuant to Rule 115(1) EPC dated Jan. 29, 2021 in connection with European Patent Application No. 18 204 695.3, 5 pages.

Notice of Patent Grant dated Dec. 1, 2020 in connection with Korean Patent Application No. 10-2020-0136938, 4 pages.

Notice of Patent Grant in connection with Korean Application No. 10-2014-0025000 dated Mar. 11, 2020, 4 pages.

First Non-Final Rejection dated Oct. 16, 2015 in connection with U.S. Appl. No. 14/210,115, 12 pages.

First Final Rejection dated Mar. 16, 2016 in connection with U.S. Appl. No. 14/210,115, 10 pages.

(56) References Cited

OTHER PUBLICATIONS

Second Non-Final Rejection dated Jul. 19, 2016 in connection with U.S. Appl. No. 14/210,115, 11 pages.
Chinese Office Action dated Dec. 4, 2017 in connection with Chinese Application No. 201480014885.9, 20 pages.
The Second Office Action dated Jul. 20, 2018 in connection with Chinese Application No. CN 201480014885.9, 17 pages.
European Search Report dated Apr. 8, 2019 in connection with for European Application No. EP 18204695.3, 8 pages.
Notice of Patent Grant in connection with Korean Application No. 10-2020-0071034 dated Jul. 21, 2020, 4 pages.
Communication pursuant to Article 94(3) EPC in connection with European Patent Application No. 18204695.3 dated Jun. 10, 2020, 5 pages.
National Intellectual Property Administration, PRC, "The Second Office Action" dated Sep. 14, 2021, in connection with Chinese Patent Application No. CN201911355618.9, 30 pages.
European Patent Office, "Provision of a copy of the minutes in accordance with Rule 124(4) EPC" issued Nov. 19, 2021, in connection with European Patent Application No. EP18204695.3, 3 pages.
Photoshop, "Synthetic Exposure Perfect Scenery and Seascape Photos" accessed via www.dooland.com/magazine/online_htm5.phppip=NTM3NjM= , Jul. 1, 2012, 7 pages.

* cited by examiner

ELECTRONIC DEVICE AND METHOD FOR GENERATING THUMBNAILS BASED ON CAPTURED IMAGES

CROSS-REFERENCE TO RELATED APPLICATIONS

This application is a continuation of application Ser. No. 16/505,400, filed Jul. 8, 2019, which is a continuation of application Ser. No. 15/469,321, filed Mar. 24, 2017, now U.S. Pat. No. 10,348,971, which is a continuation of application Ser. No. 14/210,115 filed Mar. 13, 2014, now U.S. Pat. No. 9,635,268, which claims the benefit of Provisional Application No. 61/780,635, filed Mar. 13, 2013, which claims priority to Korean Application No. 10-2014-0025000, filed Mar. 3, 2014, the contents of which are herein incorporated by reference.

BACKGROUND

1. Field

Various embodiments of the present disclosure relate to a method for processing images and an electronic device thereof.

2. Description of Related Art

With the development of Information Telecommunication (IT) technologies and semiconductor technologies, a variety of kinds of electronic devices are evolving into multimedia devices providing various multimedia services. For example, a portable electronic device can provide various multimedia services such as a broadcasting service, a wireless Internet service, a music playing service and the like.

An electronic device can provide various services using one or more images acquired through image sensors. For example, the electronic device can perform image processing such as level adjustment, noise removal, gamma correction, color space conversion and the like for image data acquired through the image sensor, using an Image Signal Processor (ISP), and provide various services.

However, because the electronic device performs various image processing using one ISP, there can be a problem of decreasing a processing speed for image data.

SUMMARY

To address the above-discussed deficiencies, it is a primary object provide an apparatus and method for efficiently processing image data acquired through one or more image sensors in an electronic device.

An embodiment of the present disclosure can provide an apparatus and method for reducing a processing delay of image data acquired through one or more image sensors in an electronic device.

An embodiment of the present disclosure can provide an apparatus and method for efficiently generating thumbnail data about capture image data in an electronic device.

An embodiment of the present disclosure can provide an apparatus and method for generating thumbnail data about capture image data using a processor different from an image processing unit (i.e., Image Signal Processor (ISP)) in an electronic device.

An embodiment of the present disclosure can provide an apparatus and method for generating thumbnail data about capture image data using one or more data generated in an image processing unit (i.e., ISP), in a different processor of an electronic device.

An embodiment of the present disclosure can provide an apparatus and method for interlocking and storing thumbnail data generated using a processor different from an image processing unit (i.e., ISP) and capture image data in an electronic device.

An embodiment of the present disclosure can provide an apparatus and method for interlocking and storing capture image data and thumbnail data using metadata generated in an image processing unit (i.e., ISP) in a different processor of an electronic device.

The above aspects are achieved by providing an electronic device and method for processing an image.

According to an embodiment of the present disclosure, an electronic device includes a first image sensor, a second image sensor, one or more image processing modules, a display, and a thumbnail generation unit. The first image sensor generates first image data. The second image sensor generates second image data. The one or more image processing modules process one or more image data among the first image and the second image data. The display unit displays the one or more image data among the first image data and second image data processed by the one or more image processing modules. The thumbnail generation module generates thumbnail data using the one or more image data among the first image data and second image data processed by the one or more image processing modules.

According to an embodiment of the present disclosure, an electronic device includes one or more processors and a display unit. The one or more processors receive image data, process the image data, and generate a preview image. The display unit displays the preview image generated by the one or more processors. The one or more processors are configured to generate an image of a smaller size than the preview image using at least part of the preview image, in response to a signal corresponding to a capture instruction.

According to an embodiment of the present disclosure, an operation method of an electronic device is provided. The method includes the operations of generating a plurality of image data using a plurality of image sensors, converting the plurality of image data into a format displayable on a display unit through one or more image processing modules, and generating thumbnail data using the image data of the displayable format converted in the image processing modules, in a other module separate from the image processing modules.

According to an embodiment of the present disclosure, an operation method of an electronic device is provided. The method includes the operations of storing one or more image data, converting one or more image data among the one or more image data into a preview image through one or more processors, and, in response to a signal indicating a capture instruction, generating an image of a smaller size than the preview image using at least part of the preview image through the processor.

According to an embodiment of the present disclosure, an electronic device includes one or more image sensors and an interface. The one or more image sensors generate image data. The interface processes the image data generated in the one or more image sensors. The interface transmits the image data to one or more modules. The one or more modules change a format of the image data based on an image data processing method of a corresponding module.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
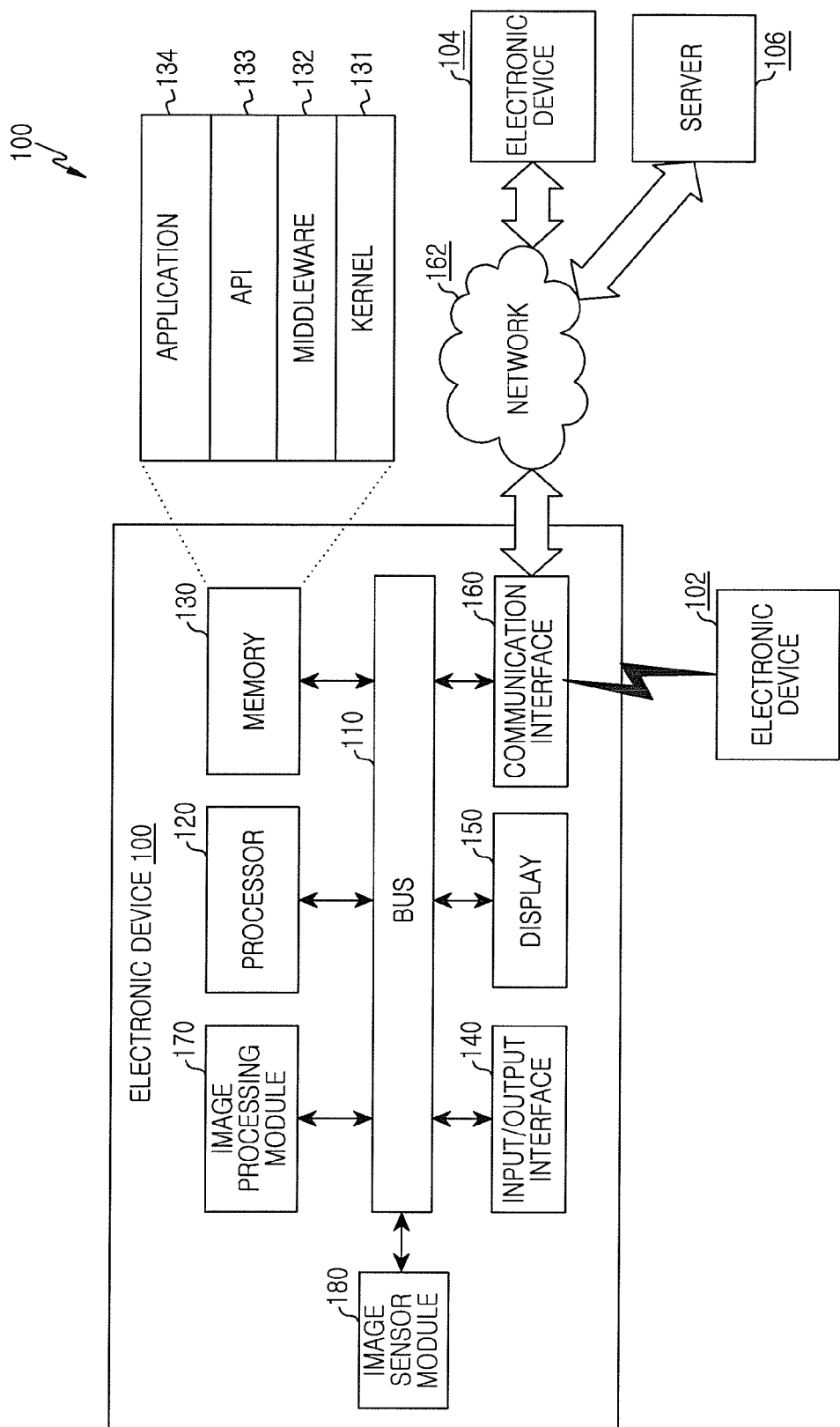
FIG. 1A is a diagram illustrating a network environment including an electronic device according to an embodiment of the present disclosure.

FIGS. 1A through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The present disclosure can be described herein below with reference to the accompanying drawings. The present disclosure can make various modifications and can have various embodiments. Specific embodiments have been exemplified in the drawings and a related detailed description has been disclosed. But, these do not intend to limit the present disclosure to a specific embodiment form, and should be understood as including all changes, equivalents or alternatives included in the spirit and technical scope of the present disclosure. In a description of the drawings, like reference numerals are used for like constituent elements.

The expressions such as "comprise", "include", "can include", "can comprise" or the like usable in the present disclosure indicate the existence of disclosed corresponding function, operation, constituent element and the like, and do not limit additional one or more functions, operations, constituent elements or the like. Also, in the present disclosure, it should be understood that terms of 'comprise', 'include', 'have', etc. are to designate the existence of a feature disclosed in the specification, a numeral, a step, an operation, a constituent element, a part, or a combination thereof, and do not previously exclude a possibility of existence or supplement of one or more other features, numerals, steps, operations, constituent elements, parts, or combinations thereof.

In the present disclosure, the expressions of "or" and the like include any and all combinations of words arrayed together. For example, "A or B" can include A, or can include B, or can include all of A and B.

In the present disclosure, the expressions of "first", "second" and the like can modify various constituent elements of the present disclosure, but do not limit the corresponding constituent elements. For example, the expressions do not limit the order and/or importance and the like of the corresponding constituent elements. The expressions can be used to distinguish one constituent element from another constituent element. For example, a first user device and a second user device are all user devices, and represent different user devices. For example, a first constituent element can be named as a second constituent element without departing from the spirit and scope of the present disclosure. Likely, even a second constituent element can be named as a first constituent element.

When it is mentioned that one constituent element is 'connected' or 'accessed' to another constituent element, it should be understood that one constituent element can be directly connected or accessed to another constituent element or the third constituent element may exist in between the two constituent elements. In contrast, when it is mentioned that one constituent element is 'directly connected' or 'directly accessed' to another constituent element, it should be understood that the third constituent element does not exist in between the two constituent elements.

The terms used in the present disclosure are used for just describing specific embodiments, and do not intend to limit the spirit and scope of the present disclosure. The expression of singular number includes the expression of plural number unless clearly intending otherwise in a context.

Unless defined otherwise, all terms used herein including a technological or scientific term have the same meaning as being commonly understood by a person having ordinary knowledge in the art to which the present disclosure belongs.

Terms as in defined in a general dictionary should be interpreted as having a meaning consistent with a contextual meaning of a related technology, and are not interpreted as an ideal or excessively formal meaning unless defined clearly in the present disclosure.

An electronic device according to an embodiment of the present disclosure can be a device including a camera function. For example, the electronic device can include at least one of a smart phone, a tablet Personal Computer (PC), a mobile phone, a video phone, an electronic book reader, a desktop PC, a laptop PC, a netbook computer, a Personal Digital Assistant (PDA), a Portable Media Player (PMP), an MPEG Audio Layer 3 (MP3) player, a mobile medical instrument, a camera, and a wearable device (e.g., a Head Mount Display (HMD) such as electronic glasses, an electronic clothes, an electronic bracelet, an electronic necklace, an electronic accessory, an electronic tattoo, or a smart watch).

According to some embodiments, the electronic device can be smart electric home appliances with a camera function. For example, the smart electric home appliances can include at least one of a television, a Digital Versatile Disc (DVD) player, an audio, a refrigerator, an air conditioner, a cleaner, an oven, a microwave, a washing machine, an air cleaner, a settop box, a TV box (for example, Samsung HomeSyn™, AppleTV™, or Google TV™), a game console, an electronic dictionary, an electronic locking system, a camcorder, and an electronic frame.

According to some embodiments, the electronic device can include at least one of various medical instruments (e.g., Magnetic Resonance Angiography (MRA), Magnetic Resonance Imaging (MRI), Computerized Tomography (CT), a moving-camera, an ultrasound machine and the like), a navigation device, a Global Positioning System (GPS) receiver, a vehicle infotainment device, a vessel electronic equipment (e.g., a vessel navigation device, a gyrocompass and the like), a flight electronic instrument, a security instrument, and an industrial or household robot.

According to some embodiments, the electronic device can include at least one of part of furniture or building/structure with a camera function, an electronic board, an electronic signature input device, a projector, and various metering instruments (e.g., tap water, electricity, gas or radio wave metering instrument and the like). The electronic device according to the present disclosure can be one of the aforementioned various devices or a combination of two or more. Also, it is obvious to those skilled in the art that the electronic device according to the present disclosure is limited to the aforementioned instruments.

Electronic devices according to various embodiments will be described below with reference to the accompanying drawings. The term of 'user' used in the various embodiments can denote a person who uses an electronic device or a device (e.g., a fuzzy electronic device) which uses the electronic device.

Below, embodiments of the present disclosure describe a technology for processing image data acquired through a plurality of image sensors in an electronic device.

FIG. 1A is a diagram illustrating a network environment 100 including an electronic device according to an embodiment of the present disclosure.

Referring to FIG. 1A, the electronic device 101 can include a bus 110, a processor 120, a memory 130, an input/output interface 140, a display 150, a communication interface 160, an image processing module 170, and an image sensor module 180.

The bus 110 can be a circuit connecting the aforementioned constituent elements with each other, and forwarding a communication signal (e.g., a control message) between the aforementioned constituent elements.

The processor 120 can receive an instruction from the aforementioned other constituent elements (e.g., the memory 130, the input/output interface 140, the display 150, the communication interface 160, the image processing module 170, or the image sensor module 180), for example, through the bus 110, deciphers the received instruction, and execute operation or data processing according to the deciphered instruction.

The memory 130 can store an instruction or data which is received from the processor 120 or the other constituent elements (e.g., the input/output interface 140, the display 150, the communication interface 160, the image processing module 170, the image sensor module 180 or the like) or is generated by the processor 120 or the other constituent elements. The memory 130 can include programming modules of a kernel 131, a middleware 132, an Application Programming Interface (API) 133, an application 134 or the like. The aforementioned respective programming modules can be composed of software, firmware, hardware or a combination of at least two or more of them.

The kernel 131 can control or manage system resources (e.g., the bus 110, the processor 120, the memory 130 or the like) used for executing operations or functions implemented in the remnant other programming modules, for example, the middleware 132, the API 133, or the application 134. Also, the kernel 131 can provide an interface of enabling the middleware 132, the API 133, or the application 134 to access and control or manage an individual constituent element of an electronic device 101.

The middleware 132 can perform a relay role of enabling the API 133 or the application 134 to communicate and exchange data with the kernel 131. Also, in relation with work requests received from the application 134, the middleware 132 can perform a control (e.g., scheduling or load balancing) of the work request using a method of allotting priority order and the like capable of using a system resource (e.g., the bus 110, the processor 120, the memory 130 or the like) of the electronic device 100 to at least one application among the application 134, for example.

The API 133, which is an interface for enabling the application 134 to control a function provided in the kernel 131 or the middleware 132, can include, for example, at least one interface or function (e.g., an instruction) for file control, window control, image processing, character control or the like.

According to various embodiments, the application 134 can include a Short Message Service (SMS)/Multimedia Message Service (MMS) application, an electronic mail (e-mail) application, a calendar application, an alarm application, a health care application (e.g., an application measuring momentum, blood sugar or the like), environment information application (e.g., an application providing pressure, humidity, temperature information or the like) or the like. Additionally or alternatively, the application 134 can be an application related with information exchange between the electronic device 101 and an external electronic device (e.g., an electronic device 102 or an electronic device 104). The application related with the information exchange can include, for example, a notification forward application for forwarding specific information to the external electronic device, or a device management application for managing the external electronic device.

For example, the notification forward application can include a function of forwarding to the external electronic device (e.g., the electronic device 102 or the electronic device 104) notification information generated in other applications (e.g., the SMS/MMS application, the e-mail application, the health care application, the environment information application or the like) of the electronic device 101. Additionally or alternatively, the notification forward application can receive the notification information from the external electronic device (e.g., the electronic device 102 or the electronic device 104) and provide the received notification information to a user, for example. The device management application can manage (e.g., install, delete or update) a function (e.g., turn-on/turn-off of the external electronic device itself or some constituent parts thereof, or adjustment of display brightness or resolution) of at least a part of the external electronic device (e.g., the electronic device 102 or the electronic device 104) communicating with the electronic device 101, an application operating in the external electronic device, or a service (e.g., a call service or a message service) provided in the external electronic device, for example.

According to various embodiments, the application 134 can include an application designated according to an attribute (e.g., kind) of the external electronic device (e.g., the electronic device 102 or the electronic device 104). For example, when the external electronic device is an MP3 player, the application 134 can include an application related with music playing. Similarly, when the external electronic device is a mobile medical instrument, the application 134 can include an application related with health care. According to one embodiment, the application 134 can include at least one of an application designated to the electronic device 101 and an application received from the external electronic device (e.g., the server 106, the electronic device 102, or the electronic device 104).

The input/output interface 140 can forward an instruction or data, which is inputted from a user through a sensor (e.g., an acceleration sensor and a gyro sensor) or an input device (e.g., a keyboard or a touch screen), for example, to the processor 120, the memory 130, the communication interface 160, or the image processing module 170 through the bus 110. For example, the input/output interface 140 can provide the processor 120 with data about a user's touch inputted through the touch screen. Also, the input/output interface 140 can output through an output device (e.g., a speaker or a display) an instruction or data received from the processor 120, the memory 130, the communication interface 160, or the image processing module 170 through the bus 110, for example. For example, the input/output interface 140 can output voice data, which is processed through the processor 120, to a user through the speaker.

The display 150 can display various information (e.g., multimedia data, text data, or the like) to a user.

The communication interface 160 can connect communication between the electronic device 101 and the external device (e.g., the electronic device 102, the electronic device 104, or the server 106). For example, the communication interface 160 can support network communication 162 (e.g., the Internet, a Local Area Network (LAN), a Wide Area Network (WAN), a telecommunication network, a cellular network, a satellite network, a Plain Old Telephone System (POTS) or the like), short-range communication 164 (e.g., Wireless Fidelity (WiFi), Bluetooth (BT), or Near Field Communication (NFC)), and wired communication (e.g., a Universe Serial Bus (USB), a High Definition Multimedia Interface (HDMI), a Recommended Standard-232 (RS-232), a POTS or the like). According to one embodiment, a protocol (e.g., short-range communication protocol, network communication protocol, or wired communication protocol) for communication between the electronic device 100 and the external device can be supported in at least one of the API 133 and the middleware 132. The electronic devices 102 and 104 each can be the same device (e.g., same-type device) as the electronic device 101 or be a different device (e.g., different-type device).

The image sensor module 180 can provide image data acquired through subject taking, to the image processing module 170. At this time, the image sensor module 180 can include at least one image sensor module functionally connected to the electronic device 101.

The image processing module 170 can perform image processing for image data provided from the image sensor module 180 or the external electronic devices 102 and 104. For example, the image processing module 170 can perform one or more image processing among level adjustment for image data, noise removal, gamma correction, and conversion into a format displayable on the display 150. The image processing module 170 can control to store image-processed image data in the memory 130 or display the image data on the display 150. For instance, the image processing module 170 can transmit the image data (e.g., YUV data) displayed on the display 150 and metadata about the corresponding image data, to the memory 130. Here, the image processing converting into the format displayable on the display 150 can include color space conversion.

The image processing module 170 can select and synthesize at least two image data among image data acquired through at least one image sensor module 180. For instance, the image processing module 170 can select and synthesize at least two image data using image acquisition time stamps corresponding to the image data or an image processing delay time and the image acquisition time stamps.

For another example, when a capture event occurs, the image processing module 170 can generate thumbnail data about capture image data using image data (e.g., a preview image) stored in the memory 130 and metadata about each image data. For instance, the image processing module 170 can generate thumbnail data about capture image data using a different module logically or physically separated from a module performing image processing for image data provided from the image sensor module 180. The thumbnail data can represent image data reducing an image to facilitate search of the corresponding image or such that a user can easily recognize the corresponding image.

Figure 1B:
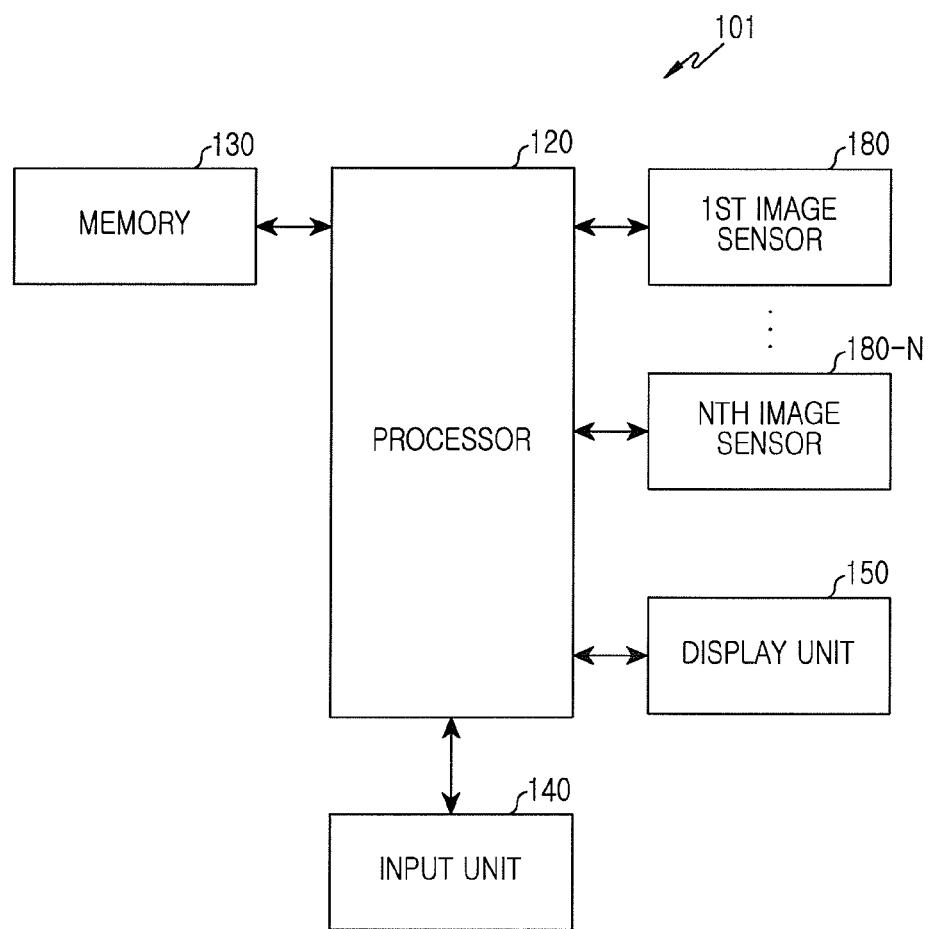
FIG. 1B is a block diagram illustrating an electronic device according to an embodiment of the present disclosure.

FIG. 1B is a block diagram illustrating an electronic device according to an embodiment of the present disclosure.

Referring to FIG. 1B, the electronic device 101 can include a processor 120, a memory 130, image sensors 180-1 to 180-N, an input unit (input interface) 140, and a display unit (i.e., a display) 150. Here, the processor 120 can include an Application Processor (AP).

The processor 120 can control the electronic device 100 to provide various services.

The processor 120 can decipher an instruction received from one or more other constituent elements (e.g., the memory 130, the image sensors 180-1 to 180-N, the display unit 150 and the input unit 140) included in the electronic device 101, and execute operation or data processing according to the deciphered instruction. For example, the processor 120 can perform one or more image processing among level adjustment for image data provided from the image sensors 180-1 to 180-N, noise removal, gamma correction, and conversion into a format displayable on the display unit 150. The processor 120 can control to store image-processed image data in the memory 130 or display the image data on the display unit 150. For instance, the processor 120 can transmit the image data (e.g., YUV data) displayed on the display unit 150 and metadata about the corresponding image data, to the memory 130. Here, the image processing converting into the format displayable on the display unit 150 can include color space conversion.

The processor 120 can execute one or more programs stored in the memory 130 and control the electronic device 101 to provide various multimedia services. For example, the processor 120 can execute the program stored in the memory 130 and select and synthesize at least two image data among image data acquired through the image sensors 180-1 to 180-N. For instance, the processor 120 can select and synthesize at least two image data using image acquisition time stamps corresponding to the image data or an image processing delay time and the image acquisition time stamps.

For another example, when a capture event occurs, the processor 120 can generate thumbnail data about capture image data using image-processed image data (e.g., a preview image) stored in the memory 130 and metadata about each image data. For instance, the processor 120 can generate thumbnail data about capture image data using a different module logically or physically separated from a module (e.g., ISP) performing image processing for image data provided from the image sensors 180-1 to 180-N.

The memory 130 can store an instruction or data which is received from one or more constituent elements included in the electronic device 101 or is generated by the one or more constituent elements. For example, the memory 130 can include an internal memory or an external memory. The internal memory can include at least one of, for example, a volatile memory (e.g., a Dynamic Random Access Memory (DRAM), a Static Random Access Memory (SRAM), a Synchronous Dynamic Random-Access Memory (SDRAM) and the like) and a nonvolatile memory (e.g., One-Time Programmable Read Only Memory (OTPROM), a Programmable Read-Only Memory (PROM), an Erasable PROM (EPROM), an Electrically Erasable Programmable ROM (EEPROM), a mask ROM, a flash ROM, a Not AND (NAND) flash memory, a Not OR (NOR) flash memory and the like). The external memory can include a flash drive, for example, at least one of Compact Flash (CF), Secure Digital (SD), micro-SD, xD and a memory stick. The external memory can be functionally connected with the electronic device 101 through various interfaces.

The image sensors 180-1 to 180-N can provide image data acquired through subject taking, to the processor 120. At this time, the image sensors 180-1 to 180-N can transmit the image data to the processor 120 through a serial interface such as Mobile Industry Processor Interface (MIPI) and Mobile Display Digital Interface (MDDI) and a parallel interface such as a parallel bus. Here, the first image sensor 180-1 can be located in front of the electronic device 101, and the Nth image sensor 180-N can be located in rear of the electronic device 101.

The input unit 140 can transmit an instruction or data inputted by a user, to the processor 120 or the memory 130. For example, the input unit 140 can include a touch input unit, a pen sensor, a key or an ultrasonic wave input device.

The display unit 150 can provide status information of the electronic device 101, a still picture, a moving picture or data through a graphical user interface. For example, the display unit 150 can display one or more images provided from the processor 120. For another example, the display unit 150 can display at least one image selected based on an image acquisition time stamp or the image acquisition time stamp and an image processing delay time in the processor 120.

Though not illustrated, the electronic device 101 can further include a communication unit capable of connecting communication with other electronic devices or servers through voice communication or data communication. Here, the communication unit can be divided into a plurality of communication sub modules supporting different communication networks.

In the aforementioned embodiment, the electronic device 101 can include a plurality of image sensors 180-1 to 180-N. At this time, among the plurality of image sensors 180-1 to 180-N, one or more image sensors can be selectively connected to the electronic device 101. For example, among the plurality of image sensors 180-1 to 180-N, the one or more image sensors can be selectively connected to the electronic device 101 through a wired interface. For another example, among the plurality of image sensors 180-1 to 180-N, the one or more image sensors can be selectively connected with the electronic device 101 through a wireless interface such as Bluetooth and a wireless LAN.

Figure 2:
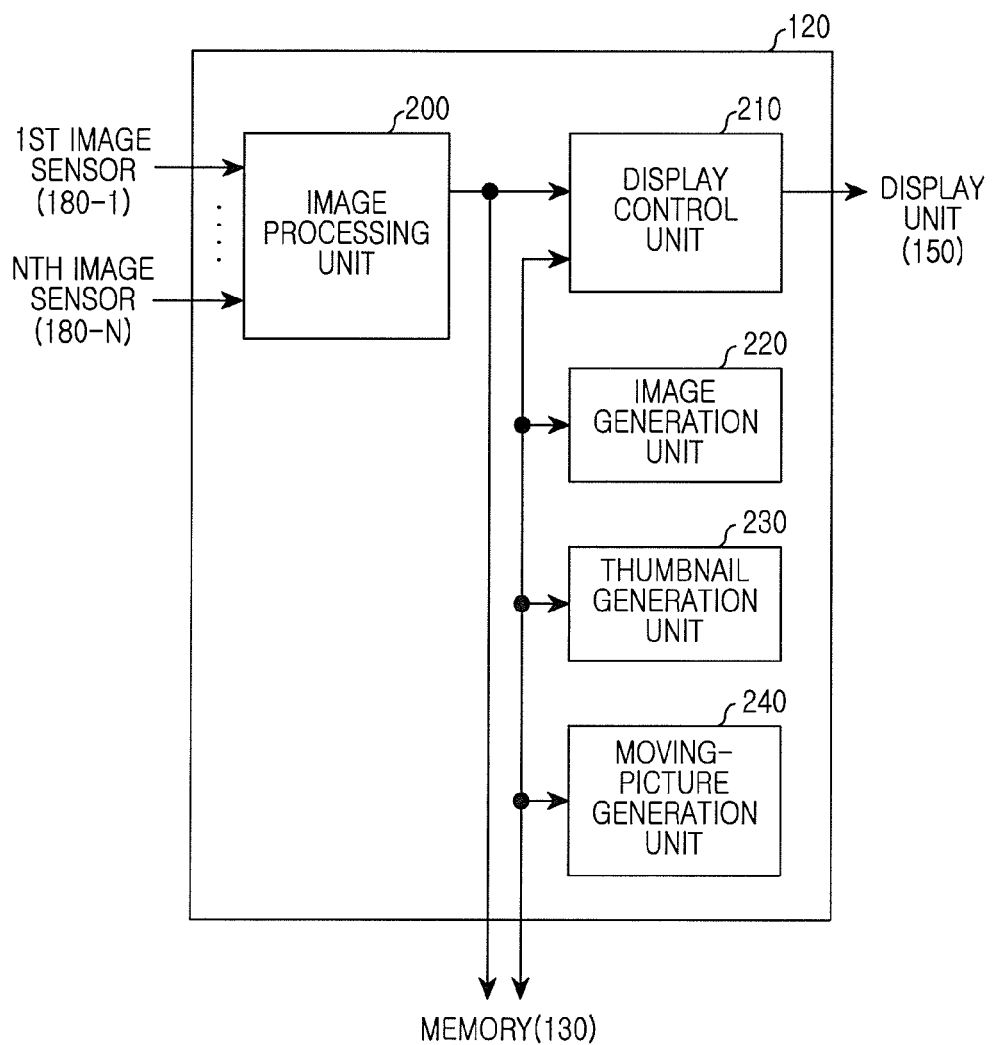
FIG. 2 is a detailed block diagram illustrating a processor according to an embodiment of the present disclosure.

FIG. 2 is a detailed block diagram illustrating a processor according to an embodiment of the present disclosure.

Referring to FIG. 2, the processor 120 can include an image processing unit (i.e., Image Signal Processor (ISP)) 200, a display control unit 210, an image generation control unit 220, a thumbnail generation unit 230, and a moving-picture generation unit 240.

The image processing unit 200 can perform one or more image processing among level adjustment for image data provided from respective image sensors 180-1 to 180-N, noise removal, gamma correction, and color space conversion. The image processing unit 200 can transmit the image-processed image data to one or more of the memory 130 and the display control unit 210. For example, the image processing unit 200 can transmit image data (e.g., YUV data) displayed on the display unit 150 and metadata about the corresponding image data, to the memory 130.

The display control unit 210 can control to provide a graphical user interface through the display unit 150. For example, the display control unit 210 can control to display image data (e.g., a preview image) provided from the image processing unit 200 or the memory 130, on the display unit 150. For instance, the display control unit 210 can control to display image data provided from the image sensors 180-1 to 180-N through the image processing unit 200, on the display unit 150 together.

The image generation control unit 220 can select and synthesize at least two image data among image data acquired through the image sensors 180-1 to 180-N. For example, when a capture event occurs, the image generation control unit 220 can select and synthesize at least two image data using an image acquisition time stamp of image data stored in the memory 130 or an image processing delay time and the image acquisition time stamp.

The thumbnail generation unit 230 can generate thumbnail data using image-processed image data (e.g., a preview image) stored in the memory 130 or metadata about the respective image data. For example, when a capture event occurs, the thumbnail generation unit 230 can generate thumbnail data using YUV data of image data stored in the memory 130 and metadata about the corresponding image data. For instance, in a case of synthesizing at least two image data acquired through the plurality of image sensors 180-1 to 180-N and generating capture image data, the thumbnail generation unit 230 can synchronize the image data based on a processing delay time of each image data and generate thumbnail data. At this time, the thumbnail generation unit 230 can interlock the capture image data and the thumbnail data using an image acquisition time stamp or frame identification information included in the metadata and store the interlock result in the memory 130.

The moving-picture generation unit 240 can encode image-processed image data stored in the memory 130 and generate moving-picture data. For example, the moving-picture generation unit 240 can include a video pre-processor and a video encoder. The video pre-processor can perform pre-processing such as zoom, rotation, color space conversion and flip for the image-processed image data stored in the memory 130 and store the pre-processing result in the memory 130. The video encoder encodes the image data pre-processed by the video pre-processor and stored in the memory 130 according to a preset encoding method, and generate the moving-picture data.

Though not illustrated, the processor 120 can further include a time setting unit capable of setting an image acquisition time stamp to one or more image data provided from the image sensors 180-1 to 180-N. For example, the time setting unit can record a time corresponding to each image data provided from the image sensors 180-1 to 180-N, in metadata of the corresponding image data every frame unit. For another example, when there are one or more image sensors selectively connectable to the electronic device 100 among the image sensors 180-1 to 180-N, the time setting unit can set an image acquisition time stamp to metadata of one or more image data provided from one or more image sensors connected to the electronic device 101. At this time, image acquisition time stamps can be set to images acquired through one or more image sensors capable of being selectively connected to the electronic device 101 by a separate module included in each image sensor.

In the aforementioned embodiment, the processor 120 can process image data provided from the image sensors 180-1 to 180-N through one image processing unit 200.

In another embodiment, the processor 120 can include a plurality of image processing units and process image data provided from the respective image sensors 180-1 to 180-N.

Figure 3:
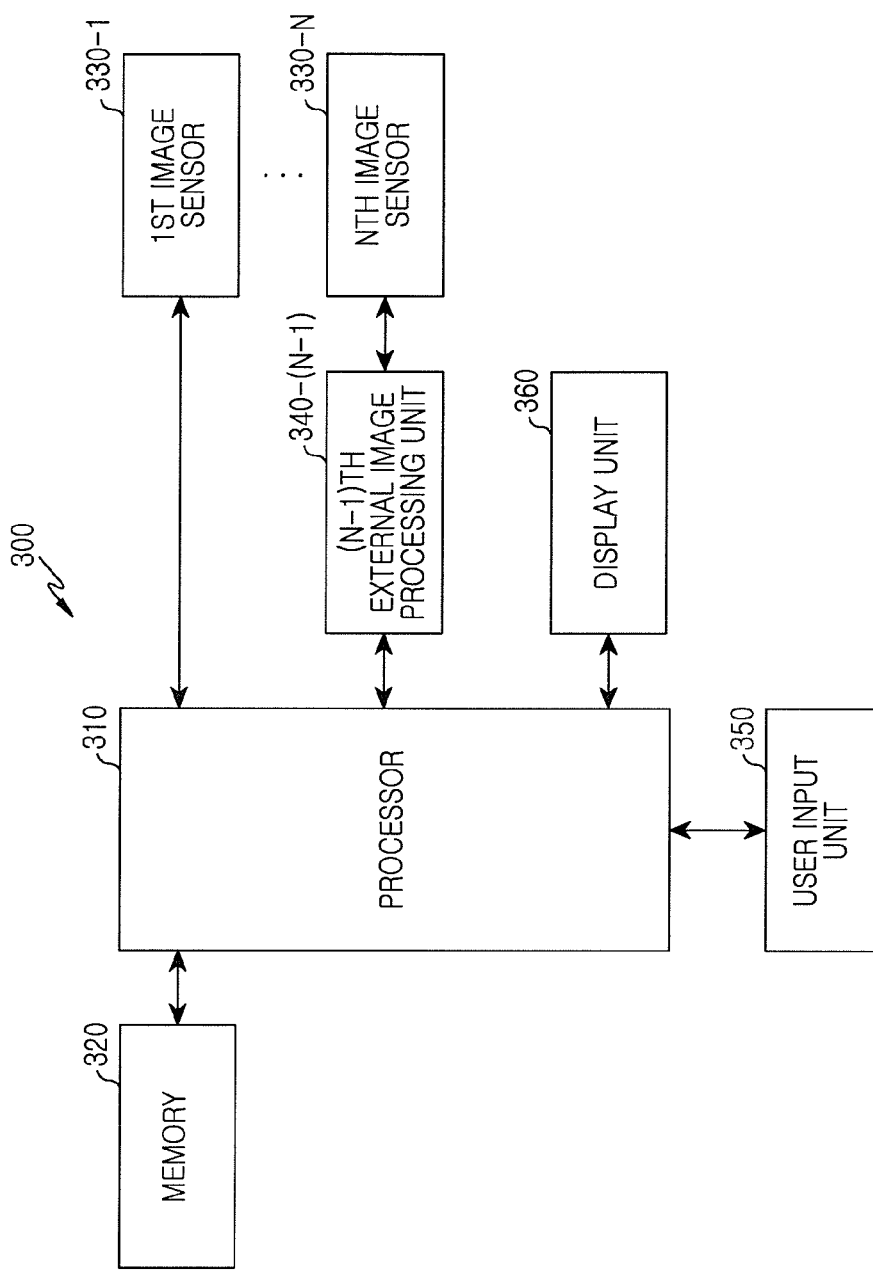
FIG. 3 is a block diagram illustrating an electronic device according to another embodiment of the present disclosure.

FIG. 3 is a block diagram illustrating an electronic device according to another embodiment of the present disclosure.

Referring to FIG. 3, the electronic device 300 can include a processor 310, a memory 320, image sensors 330-1 to 330-N, external image processing units 340-1 to 340-(N−1), an input unit 350, and a display unit 360. Here, the processor 310 can include an AP.

The processor 310 can control the electronic device 300 to provide various services.

The processor 310 can decipher an instruction received from one or more other constituent elements (e.g., the memory 320, the first image sensor 330-1, the external image processing units 340-1 to 340-(N−1), the input unit 350, and the display unit 360) included in the electronic device 300, and execute operation or data processing according to the deciphered instruction. For example, the processor 310 can perform one or more image processing among level adjustment for image data provided from the first image sensor 330-1, noise removal, gamma correction, and conversion into a format displayable on the display unit 360. The processor 310 can control to store image-processed image data in the memory 320 or display the image data on the display unit 360. For instance, the processor 310 can transmit the image data (e.g., YUV data) displayed on the display unit 360 and metadata about the corresponding image data, to the memory 320. For another instance, the processor 310 can control to convert images stored in the memory 320 into the format displayable on the display unit 360 through the external image processing units 340-1 to 340-(N−1) and display the converted images on the display unit 360. Here, the image processing converting into the format displayable on the display unit 360 can include color space conversion.

The processor 310 can execute one or more programs stored in the memory 320 and control the electronic device 300 to provide various multimedia services. For example, the processor 310 can execute the program stored in the memory 320 and select and synthesize at least two image data among image data acquired through the image sensors 330-1 to 330-N. For instance, the processor 310 can select and synthesize at least two image data using image acquisition time stamps corresponding to the image data or an image processing delay time and the image acquisition time stamps.

For another example, when a capture event occurs, the processor 310 can generate thumbnail data about capture image data using image-processed image data (e.g., a preview image) stored in the memory 320 and metadata about each image data. For instance, the processor 310 can generate thumbnail data about capture image data using a different module logically or physically separated from an internal module (e.g., ISP) of the processor 310 performing image processing for image data provided from the first image sensor 330-1. At this time, the different module can be logically or physically distinguished from the internal module processing an image within the processor 310, or be distinguished physically from the processor 310.

The memory 320 can store an instruction or data received from one or more constituent elements included in the electronic device 300 or generated by the one or more constituent elements.

The image sensors 330-1 to 330-N can provide a collected image acquired through subject taking, to the processor 310. At this time, the image sensors 330-1 to 330-N can transmit the image to the processor 310 or the external image processing units 340-1 to 340-(N−1) through a serial interface such as MIPI and MDDI and a parallel interface such as a parallel bus. Here, the first image sensor 330-1 can be located in front of the electronic device 300, and the Nth image sensor 330-N can be located in rear of the electronic device 300.

The external image processing units 340-1 to 340-(N−1) can control to perform image processing such as level adjustment for images provided from the image sensors 330-2 to 330-N, noise removal, and gamma correction and store the processing result in the memory 320 through the processor 310. Here, the external image processing units 340-1 to 340-(N−1) can further include a time setting unit capable of setting an image acquisition time stamp to image data about the images provided from the image sensors 330-2 to 330-N. For example, the time setting unit can record a time corresponding to each image data provided from the image sensors 330-2 to 330-N, in metadata of corresponding image data every frame unit.

The input unit 350 can transmit an instruction or data inputted by a user, to the processor 310 or the memory 320. For example, the input unit 350 can include a touch input unit, a pen sensor, a key or an ultrasonic wave input device.

The display unit 360 can provide status information of the electronic device 300, a still picture, a moving picture or data through a graphical user interface. For example, the display unit 360 can display one or more image data provided from the processor 310. For another example, the display unit 360 can display at least one image data selected based on an image acquisition time stamp or the image acquisition time stamp and an image processing delay time in the processor 310.

Though not illustrated, the electronic device 300 can further include a communication unit capable of connecting communication with other electronic devices or servers through voice communication or data communication. Here, the communication unit can be divided into a plurality of communication sub modules supporting different communication networks.

In the aforementioned embodiment, the electronic device 300 can include a plurality of image sensors 330-1 to 330-N. At this time, among the plurality of image sensors 330-1 to 330-N, one or more image sensors can be selectively connected to the electronic device 300. For example, among the plurality of image sensors 330-1 to 330-N, the one or more image sensors can be selectively connected to the electronic device 300 through a wired interface. In this case, the external image processing unit connected to the one or more image sensors selectively connectable to the electronic device 300 can be mounted in the electronic device 300, or be selectively connected to the electronic device 300 together with the image sensor.

For another example, among the plurality of image sensors 330-1 to 330-N, the one or more image sensors can be selectively connected with the electronic device 300 through a wireless interface such as Bluetooth and a wireless LAN. In this case, the external image processing unit connected to the one or more image sensors selectively connectable to the electronic device 300 can be connected to the electronic device 300, or be selectively connected to the electronic device 300 together with the image sensor.

Figure 4:
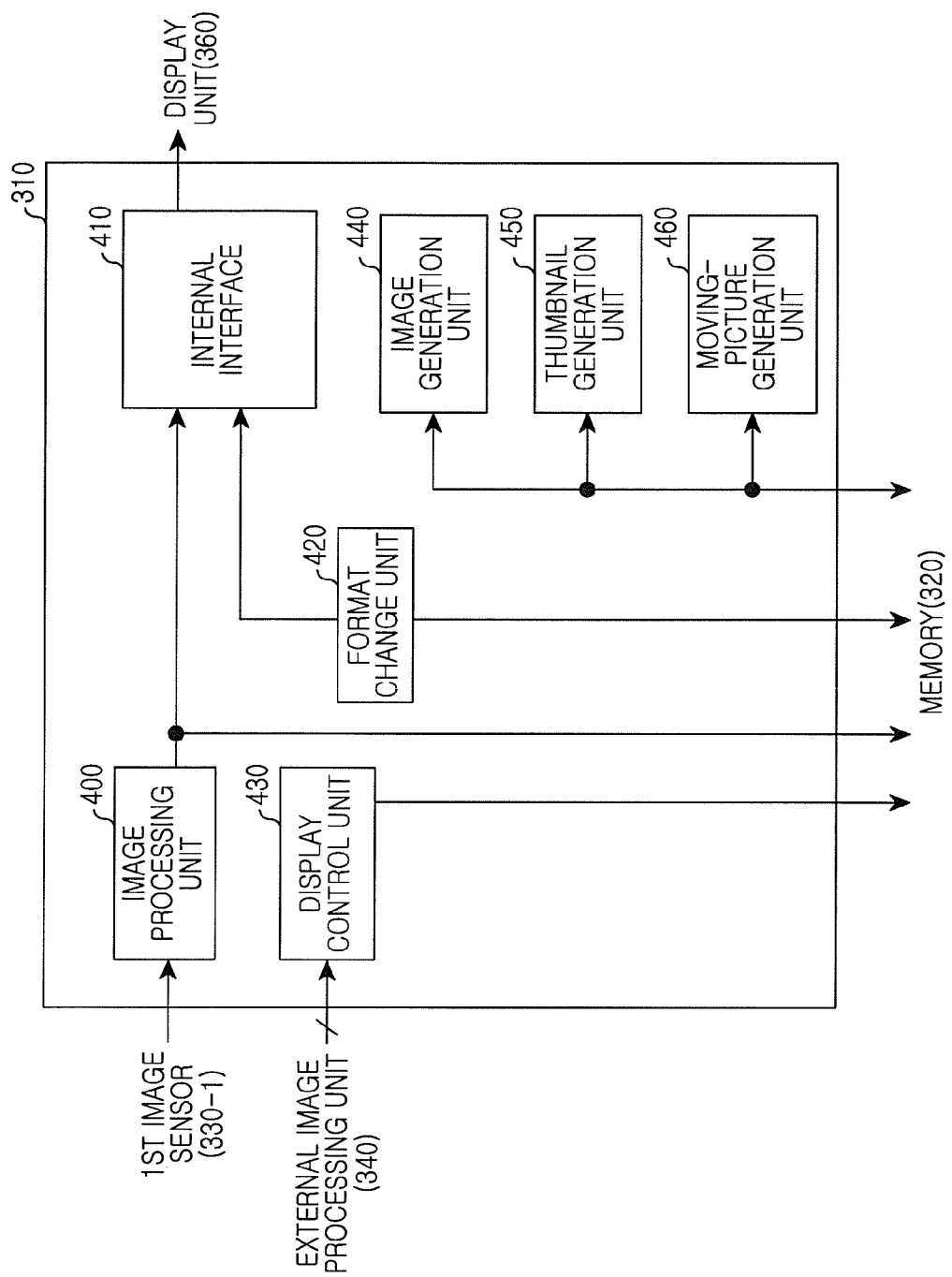
FIG. 4 is a detailed block diagram illustrating a processor according to another embodiment of the present disclosure.

FIG. 4 is a detailed block diagram illustrating a processor according to another embodiment of the present disclosure.

Referring to FIG. 4, the processor 310 can include an image processing unit (i.e., ISP) 400, an internal interface 410, a format change unit 420, a display control unit 430, an image generation control unit 440, a thumbnail generation unit 450, and a moving-picture generation unit 460.

The image processing unit 400 can perform one or more image processing among level adjustment for image data provided from a first image sensor 330-1, noise removal, gamma correction, and color space conversion. The image processing unit 400 can transmit the image-processed image data to one or more of the memory 320 and the display control unit 430. For example, the image processing unit 400 can transmit image data (e.g., YUV data) displayed on the display unit 360 and metadata about the corresponding image data, to the memory 320.

The internal interface 410 can transmit to the memory 320 image data provided from respective external image processing units 340-1 to 340-(N−1). For example, the internal interface 410 can include one or more of MIFI and CAMIF.

The format change unit 420 can change image data provided from the external image processing units 340-1 to 340-(N−1) stored in the memory 320, into a format of image data displayable on the display unit 360. For example, the format change unit 420 can color-space convert the image data provided from the memory 320 and transmit the image data to the display control unit 430. For instance, the format change unit 420 can control to store in the memory 320 the image data provided from the external image processing units 340-1 to 340-(N−1) changed into the format of the image data displayable on the display unit 360.

The display control unit 430 can control to provide a graphical user interface through the display unit 360. For example, the display control unit 430 can control to display on the display unit 360 images provided from one or more of the image processing unit 400 and the format change unit 420. For instance, the display control unit 430 can control to display image data provided from the first image sensor 330-1 provided through the image processing unit 400 and image data of the Nth image sensor 330-N provided through the format change unit 420, on the display unit 360 together.

The image generation control unit 440 can select and synthesize at least two image data among image data acquired through the image sensors 330-1 to 330-N. For example, when a capture event occurs, the image generation control unit 440 can select and synthesize at least two image data using an image acquisition time stamp of images stored in the memory 320 or an image processing delay time and the image acquisition time stamp.

The thumbnail generation unit 450 can generate thumbnail data using image-processed image data stored in the memory 320 or metadata about the respective image data. For example, when a capture event occurs, the thumbnail generation unit 450 can generate thumbnail data using YUV data of each image data stored in the memory 320 and metadata about the corresponding image data. For instance, in a case of synthesizing at least two image data acquired through the plurality of image sensors 330-1 to 330-N and generating capture image data, the thumbnail generation unit 450 can synchronize the image data based on a processing delay time of each image data and generate thumbnail data. At this time, the thumbnail generation unit 450 can interlock the capture image data and the thumbnail data using an image acquisition time stamp or frame identification information included in the metadata and store the interlock result in the memory 320.

The moving-picture generation unit 460 can encode image-processed image data stored in the memory 320 and generate moving-picture data. For example, the moving-picture generation unit 460 can include a video pre-processor and a video encoder. The video pre-processor can perform pre-processing such as zoom, rotation, color space conversion and flip for the image-processed image data stored in the memory 320 and store the pre-processing result in the memory 320. The video encoder encodes the image data pre-processed by the video pre-processor and stored in the memory 320 according to a preset encoding method, and generate the moving-picture data.

Though not illustrated, the processor 310 can further include a time setting unit capable of setting an image acquisition time stamp to image data provided from the first image sensor 330-1 or the first image sensor 330-1 and the external image processing units 340-1 to 340-(N−1). For example, the time setting unit can record a time corresponding to image data provided from the first image sensor 330-1, in metadata of the corresponding image data every frame unit. At this time, image acquisition time stamps can be set to the image data acquired through the second image sensor 330-2 to the Nth image sensor 330-N by the external image processing unit connected to each image sensor.

In the aforementioned embodiment, the processor 310 can include the format change unit 420 for changing the image data provided from the external image processing units 340-1 to 340-(N−1) into the format of image data displayable on the display unit 360.

In another embodiment, if the external image processing units 340-1 to 340-(N−1) can change the image data into the format of image data displayable on the display unit 360, the processor 310 can be constructed to exclude the format change unit 420.

Figure 5:
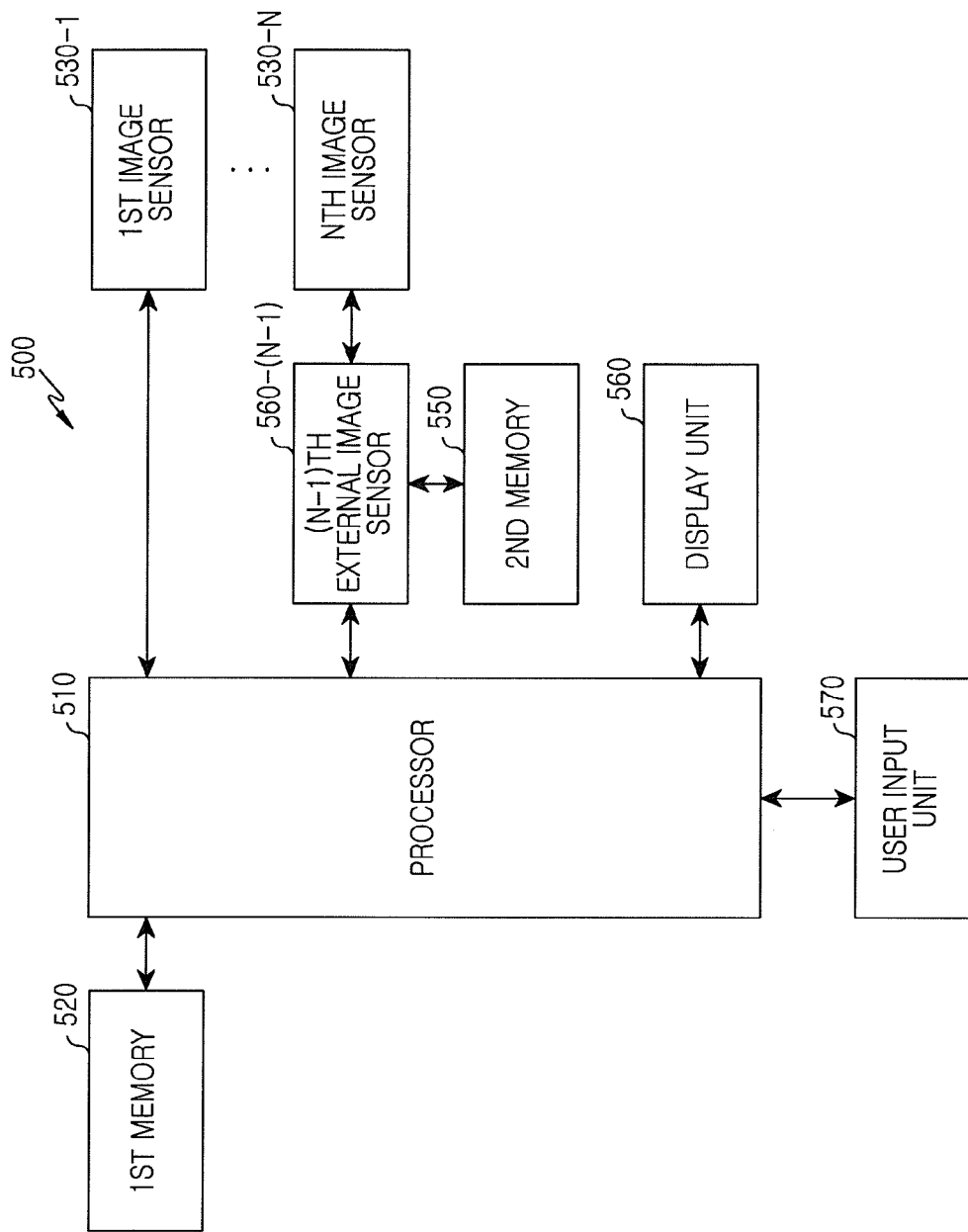
FIG. 5 is a block diagram illustrating an electronic device according to a further embodiment of the present disclosure.

FIG. 5 is a block diagram illustrating an electronic device according to a further embodiment of the present disclosure.

Referring to FIG. 5, the electronic device 500 can include a processor 510, memories 520 and 550, image sensors 530-1 to 530-N, external image processing units 540-1 to 540-(N−1), a display unit 560, and an input unit 570. Here, the processor 510 can include an AP.

The processor 510 can control the electronic device 500 to provide various services.

The processor 510 can decipher an instruction received from one or more other constituent elements included in the electronic device 500, and execute operation or data processing according to the deciphered instruction. For example, the processor 510 can perform one or more image processing among level adjustment for image data provided from the first image sensor 530-1, noise removal, gamma correction, and conversion into a format displayable on the display unit 560. The processor 510 can control to store image-processed image data in the first memory 520 or display the image data on the display unit 560. For instance, the processor 510 can transmit the image data (e.g., YUV data) displayed on the display unit 560 and metadata about the corresponding image data, to the first memory 520. Here, the image processing converting into the format displayable on the display unit 560 can include color space conversion.

The processor 510 can execute one or more programs stored in the first memory 520 and control the electronic device 500 to provide various multimedia services. For example, the processor 510 can execute the program stored in the memory 520 and select and synthesize at least two image data among image data acquired through the image sensors 530-1 to 530-N. For instance, the processor 510 can select and synthesize at least two image data using image acquisition time stamps corresponding to the image data or an image processing delay time and the image acquisition time stamps.

For another example, when a capture event occurs, the processor 510 can generate thumbnail data about capture image data using image-processed image data (e.g., a preview image) stored in the first memory 520 and metadata about each image data. For instance, the processor 510 can generate thumbnail data about capture image data using a different module separate from a module (e.g., ISP) performing image processing for image data provided from the first image sensor 530-1.

The first memory 520 can store an instruction or data received from one or more constituent elements included in the electronic device 500 or generated by the one or more constituent elements.

The image sensors 530-1 to 530-N can provide an image acquired through subject taking, to the processor 510. At this time, the image sensors 530-1 to 530-N can transmit the image to the processor 510 or the external image processing units 540-1 to 540-(N−1) through a serial interface such as MIPI and MDDI and a parallel interface such as a parallel bus. Here, the first image sensor 530-1 can be located in front of the electronic device 500, and the Nth image sensor 530-N can be located in rear of the electronic device 500.

The external image processing units 540-1 to 540-(N−1) can control to perform image processing such as level adjustment for image data provided from the image sensors 530-2 to 530-N, noise removal, gamma correction, and color space conversion and store the processing result in the first memory 520. Also, the external image processing units 540-1 to 540-(N−1) can control to set time information to the image data provided from the image sensors 530-2 to 530-N and store the image data setting the time information in the second memory 550. For instance, the external image processing units 540-1 to 540-(N−1) can set time information to metadata of corresponding image data.

The second memory 550 can store non-processed image data provided from the external image processing units 540-1 to 540-(N−1). For example, the second memory 550 can store raw image data provided from the external image processing units 540-1 to 540-(N−1). At this time, the second memory 550 can exist by each of the external image processing unit 540-1 or 540-(N−1).

The display unit 560 can provide status information of the electronic device 500, a still picture, a moving picture or data through a graphical user interface. For example, the display unit 560 can display one or more image data provided from the processor 510. For another example, the display unit 560 can display at least two image data selected based on an image acquisition time stamp or the image acquisition time stamp and an image processing delay time in the processor 510.

The input unit 570 can transmit an instruction or data inputted by a user, to the processor 510 or the first memory 520. For example, the input unit 570 can include a touch input unit, a pen sensor, a key or an ultrasonic wave input device.

Though not illustrated, the electronic device 500 can further include a communication unit capable of connecting communication with other electronic devices or servers through voice communication or data communication. Here, the communication unit can be divided into a plurality of communication sub modules supporting different communication networks.

In the aforementioned embodiment, the electronic device 500 can include a plurality of image sensors 530-1 to 530-N. At this time, among the plurality of image sensors 530-1 to 530-N, one or more image sensors can be selectively connected to the electronic device 500. For example, among the plurality of image sensors 530-1 to 530-N, the one or more image sensors can be selectively connected to the electronic device 500 through a wired interface. In this case, the external image processing unit connected to the one or more image sensors selectively connectable to the electronic device 500 can be mounted in the electronic device 500, or be selectively connected to the electronic device 500 together with the image sensor.

For another example, among the plurality of image sensors 530-1 to 530-N, the one or more image sensors can be selectively connected with the electronic device 500 through a wireless interface such as Bluetooth and a wireless LAN. In this case, the external image processing unit connected to the one or more image sensors selectively connectable to the electronic device 500 can be connected to the electronic device 500, or be selectively connected to the electronic device 500 together with the image sensor.

Figure 6:
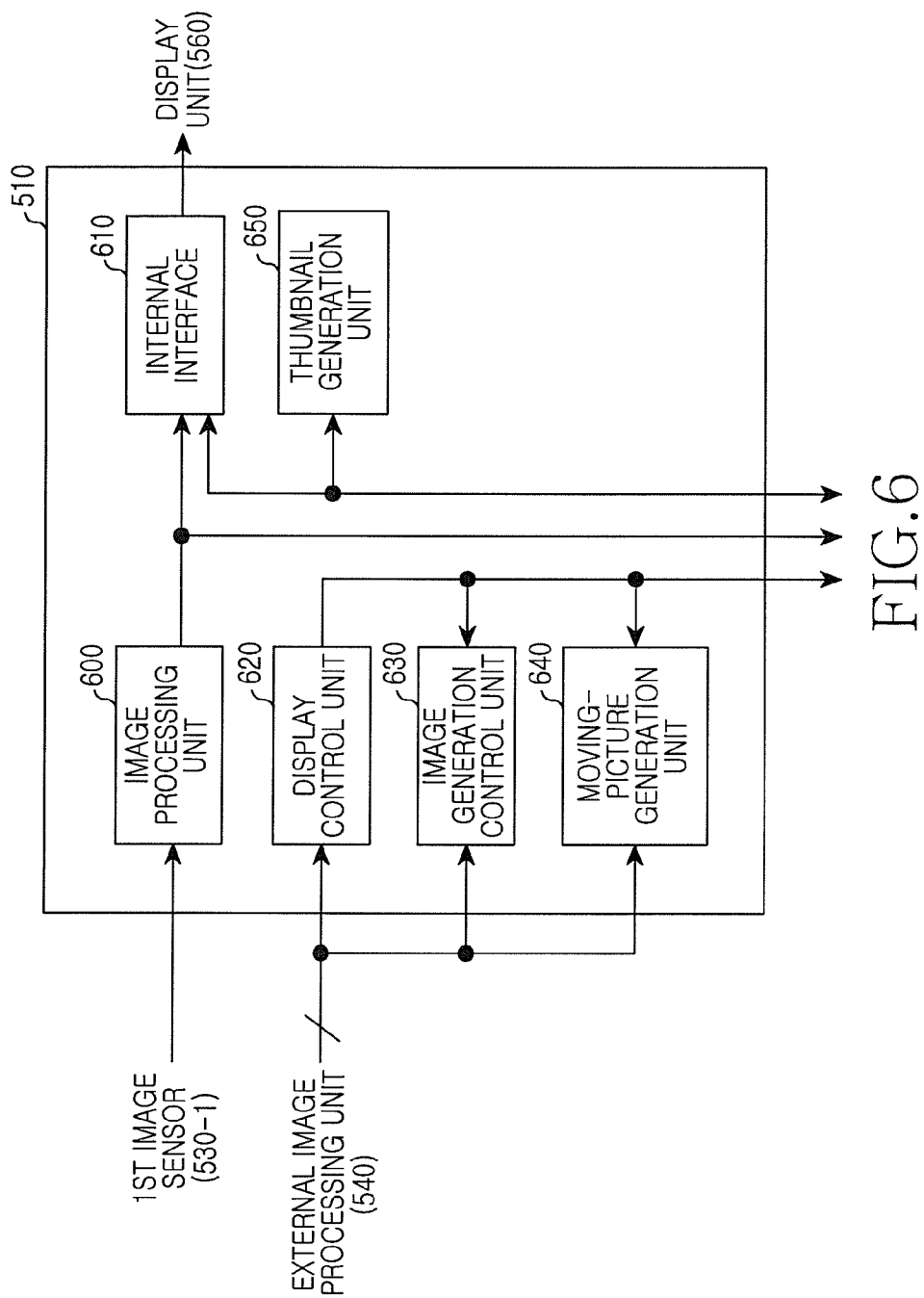
FIG. 6 is a detailed block diagram illustrating a processor according to a further embodiment of the present disclosure.

FIG. 6 is a detailed block diagram illustrating a processor according to a further embodiment of the present disclosure.

Referring to FIG. 6, the processor 510 can include an image processing unit (i.e., ISP) 600, an internal interface 610, a display control unit 620, an image generation control unit 630, a moving-picture generation unit 640, and a thumbnail generation unit 650.

The image processing unit 600 can perform one or more image processing among level adjustment for image data provided from a first image sensor 530-1, noise removal, gamma correction, and color space conversion. The image processing unit 600 can transmit the image-processed image data to one or more of the first memory 520 and the display control unit 620. For example, the image processing unit 600 can transmit image data (e.g., YUV data) displayed on the display unit 560 and metadata about the corresponding image data, to the first memory 520.

The internal interface 610 can transmit to the first memory 520 images provided from respective external image processing units 540-1 to 540-(N−1). For example, the internal interface 610 can include one or more of MIFI and CAMIF, and RDI for transmitting an image converted into a format displayable on the display unit 560 in the external image processing unit 540-1 or 540-(N−1).

The display control unit 620 can control to provide a graphical user interface through the display unit 560. For example, the display control unit 620 can control to display on the display unit 560 image data provided from one or more of the image processing unit 600 and the first memory 520. For instance, the display control unit 620 can control to display image data of the first image sensor 530-1 provided through the image processing unit 600 and image data of the Nth image sensor 530-N acquired from the first memory 520, on the display unit 560 together.

The image generation control unit 630 can select and synthesize at least two image data among image data acquired through the image sensors 530-1 to 530-N. For example, when a capture event occurs, the image generation control unit 630 can select and synthesize at least two image data using an image acquisition time stamp of image data stored in the first memory 520 and the second memory 550 or an image processing delay time and the image acquisition time stamp.

The moving-picture generation unit 640 can encode image-processed image data stored in the first memory 520 and the second memory 550 and generate moving-picture data. For example, the moving-picture generation unit 640 can include a video pre-processor and a video encoder. The video pre-processor can perform pre-processing such as zoom, rotation, color space conversion and flip for the image data stored in the first memory 520 and the second memory 550 and store the pre-processing result in one or more of the first memory 520 and the second memory 550. The video encoder can encode the image data pre-processed by the video pre-processor and stored in one or more of the first memory 520 and the second memory 550 according to a preset encoding method, and generate the moving-picture data.

The thumbnail generation unit 650 can generate thumbnail data using image-processed image data (e.g., a preview image) stored in the first memory 520 or metadata about the respective image data. For example, when a capture event occurs, the thumbnail generation unit 650 can generate thumbnail data using YUV data of each image data stored in the first memory 520 and metadata about the corresponding image data. For instance, in a case of synthesizing at least two image data acquired through the plurality of image sensors 530-1 to 530-N and generating capture image data, the thumbnail generation unit 650 can synchronize the image data based on a processing delay time of each image data and generate thumbnail data. At this time, the thumbnail generation unit 650 can interlock the capture image data and the thumbnail data using an image acquisition time stamp or frame identification information included in the metadata and store the interlock result in the first memory 520.

Though not illustrated, the processor 510 can further include a time setting unit capable of setting an image acquisition time stamp to image data provided from the first image sensor 530-1 or the first image sensor 530-1 and the external image processing units 540-1 to 540-(N−1). For example, the time setting unit can record a time corresponding to image data provided from the first image sensor 530-1, in metadata of the corresponding image data every frame unit. At this time, image acquisition time stamps can be set to images acquired through the second image sensor 530-2 to the Nth image sensor 530-N by the external image processing unit connected to each image sensor. For another example, the time setting unit can record a time corresponding to image data provided from the external image processing unit 540-(N−1), in metadata of the corresponding image data every frame unit. In this case, the image generation control unit 630 can select and synthesize at least two images for synthesizing based on an image acquisition time stamp of images stored in the first memory 520.

Figure 7:
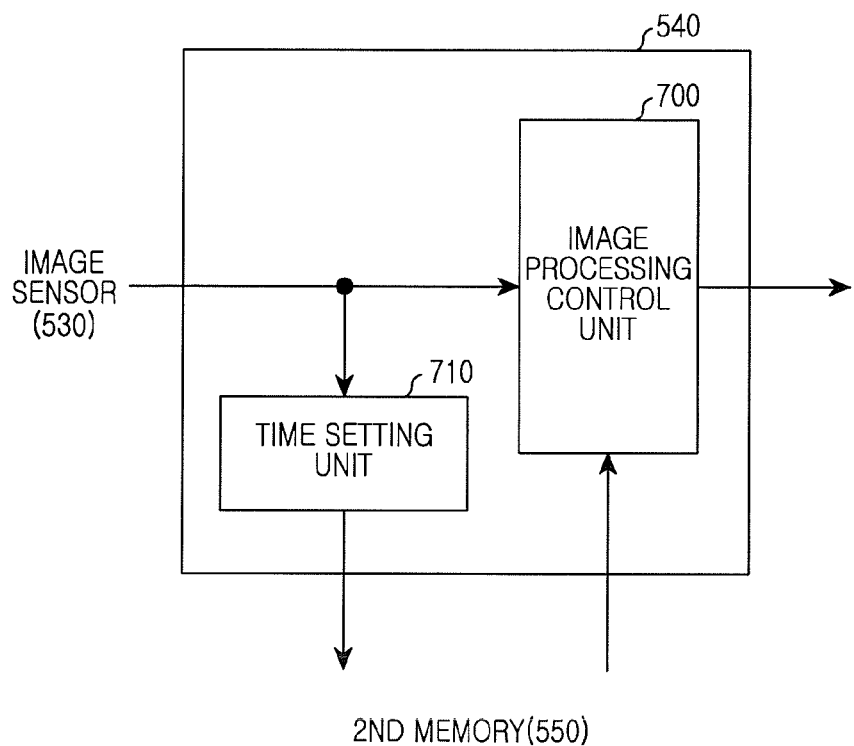
FIG. 7 is a detailed block diagram illustrating an external image processing unit according to an embodiment of the present disclosure.

FIG. 7 is a detailed block diagram illustrating an external image processing unit according to an embodiment of the present disclosure.

Referring to FIG. 7, the external image processing unit 540 can include an image processing control unit 700 and a time setting unit 710.

The image processing control unit 700 can perform one or more image processing among level adjustment for image data provided from the image sensor 530-2 or 530-N, noise removal, gamma correction, and conversion into a format displayable on the display unit 560. For example, the image processing control unit 700 can color-space convert image data of YUV422 provided from the image sensor 530-2 to 530-N into image data of YUV 420 so as to convert into a format displayable on the display unit 560.

The image processing control unit 700 can convert one or more image data stored in the second memory 550 into a format displayable on the display unit 560 and transmit the converted image data to the image generation control unit 630. For example, the image processing control unit 700 can receive image data selected for image synthesis from the second memory 550 according to control of the image generation control unit 630 of FIG. 6, convert the received image data into the format displayable on the display unit 560, and transmit the converted image data to the image generation control unit 630. For another example, when a capture event occurs, the image processing control unit 700 can convert one or more image data among images stored in the second memory 550 into the format displayable on the display unit 560 and transmit the converted image data to the image generation control unit 630.

The time setting unit 710 can set an image acquisition time stamp to image data provided from the image sensor 530-2 or 530-N. For example, the time setting unit can include a time insertion unit and a frame setting unit and record a time corresponding to the image data provided from the image sensor 530-2 or 530-N every frame unit.

In the aforementioned embodiment, the external image processing unit 540 can include the image processing control unit 700 and the time setting unit 710. In another embodiment, the time setting unit 710 can be located outside the external image processing unit 540.

Figure 8:
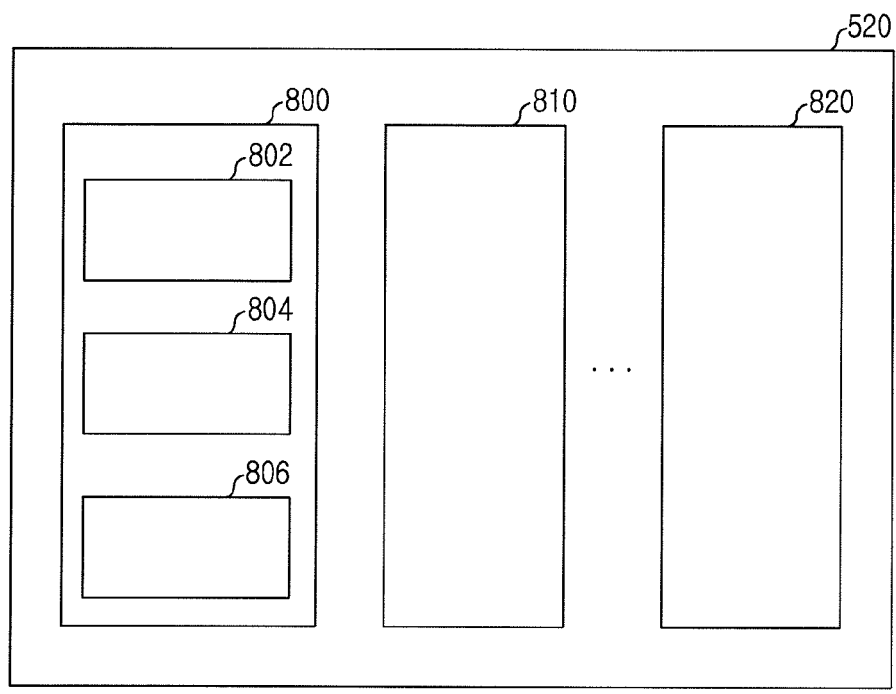
FIG. 8 is a detailed block diagram illustrating a memory according to an embodiment of the present disclosure.

FIG. 8 is a detailed block diagram illustrating a memory according to an embodiment of the present disclosure.

Referring to FIG. 8, the first memory 520 can be logically or physically divided into a plurality of blocks 800, 810, and 820 to store data. For example, image data provided from the image processing unit 600 of the processor 510 can be stored in the third block 820 of the first memory 520.

The image data provided from the external image processing units 540-1 to 540-(N−1) can be stored in the first block 800 of the first memory 520. At this time, the image data can be divided into Y data, UV data, and metadata and be stored in internal blocks 802, 804, and 806 in the first block 800. Here, the metadata can include one or more of a frame identifier of image data, an image acquisition time stamp, focus information, and image setting information (EXIF).

When a capture event occurs, image data stored in the second memory 550 can be stored in the third block 820 of the first memory 520 through the external image processing unit 540-1 to 540-(N−1).

In the aforementioned embodiment, the electronic device can transmit image data generated through an image sensor, to each module using a serial interface and a parallel interface. For example, an electronic device can transmit the image data generated through the image sensor, to each module using a MIPI interface constructed as in FIG. 9 below.

Figure 9:
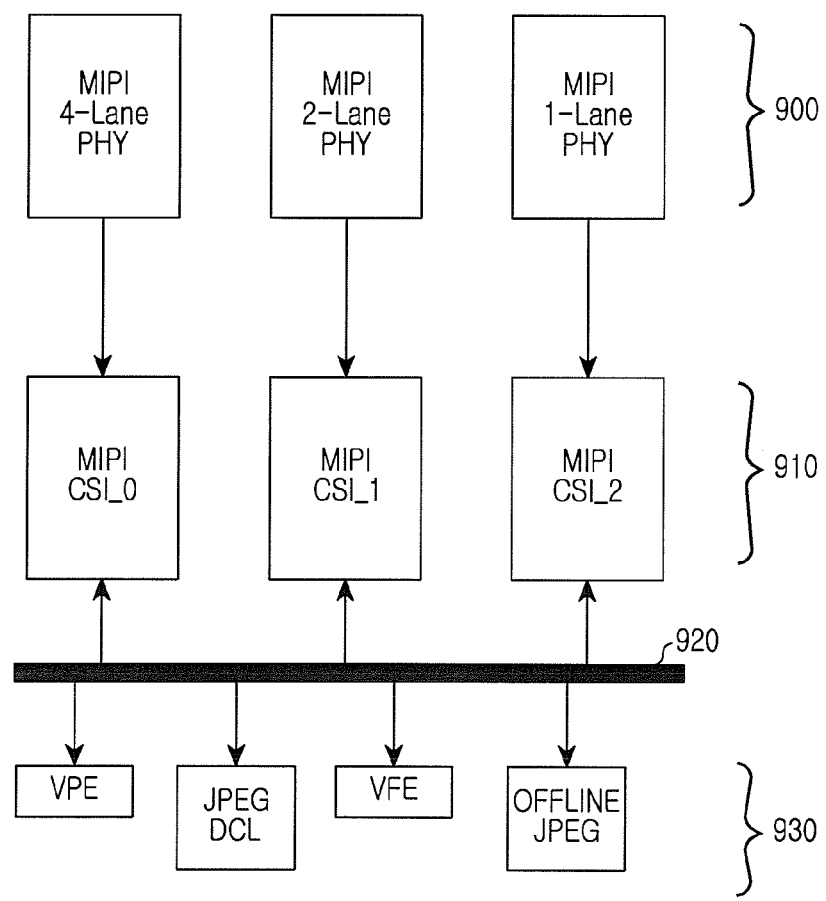
FIG. 9 is a block diagram illustrating an interface according to an embodiment of the present disclosure.

FIG. 9 is a block diagram illustrating an interface according to an embodiment of the present disclosure.

Referring to FIG. 9, a MIPI interface can include a plurality of lanes 900 according to a format of data. For example, the MIPI interface can be composed of a MIPI 4-Lane PHY, a MIPI 2-Lane PHY, and a MIPI 1-Lane PHY according to a transmission data capacity.

The MIPI interface can transmit image data to a corresponding module 930 through a serial interface (e.g., a Camera Serial Interface (CSI)) 910 corresponding to each lane 900. For example, the MIPI 4-Lane PHY can transmit the image data to one or more modules through MIPI CSI_0, and the MIPI 2-Lane PHY can transmit the image data to one or more modules through a MIPI CSI_1, and the MIPI 1-Lane PHY can transmit the image data to one or more modules through a MIPI CSI_2.

The module receiving image data through the MIPI interface can process a format of the image data according to a characteristic of each module. For example, a VPE module can perform image processing such as zoom, rotation, color space conversion and flip for the image data provided through the MIPI interface. A Joint Photographic Experts Group (JPEG) Decoding (DCD) module can support a hardware acceleration function necessary for decoding image data of a JPEG format provided through the MIPI interface. A VFE module can apply various effects such as color change to the image data provided through the MIPI interface. An offline JEPG module can support a hardware acceleration function necessary for encoding the image data of the JPEG format provided through the MIPI interface.

When transmitting the image data through the MIPI interface constructed as above, an electronic device can use a division transmission method of dividing and transmitting image data due to the limitation of a memory and a transmission capacity of the MIPI interface. For example, when transmitting image data of 11 Mega Bytes (MB), the electronic device can divide the image data of 11 MB into 8 MB data 1200 and 3 MB data 1210 and transmit the divided image data through the MIPI interface. For instance, the electronic device can divide image data of 11 MB into 8 MB data 1200 and 3 MB data 1210 and store the divided image data as in FIG. 12A, and transmit the divided image data 1200 and 1210 through a PIPE method. The memory of the electronic device receiving the data 1200 and 1210 divided through the MIPI interface can collect the divided data 1200 and 1210 as one data and store the divided data 1200 and 1210 in a divided format. As in FIG. 12B, the electronic device can flexibly set the size (e.g., the size of divided data) of the memory and the number of division of data. For another example, if the electronic device can transmit data of 11 MB at one time through the MIPI interface, as in FIG. 12B, the electronic device can use a preset data capacity (e.g., 3 MB) among the 11 MB for a preview image, and transmit raw image data using the remnant data capacity (e.g., 8 MB). In this case, the electronic device can transmit the raw image data at one time or divide and transmit the raw image data through the MIPI interface based on the size of the raw image data. For instance, if raw image data is 7 MB, the electronic device can transmit 3 MB for a preview image and 7 MB for the raw image data at one time through the MIPI interface. If raw image data is 15 MB, the electronic device can fixedly use 3 MB for a preview image, and divide the raw image data into 8 MB and 7 MB raw image data and transmit the 8 MB and 7 MB raw image data at one time through the MIPI interface over twice. When dividing and transmitting the raw image data, the electronic device can combine the divided raw image data into one image using metadata.

According to an embodiment of the present disclosure, an electronic device includes a first image sensor, a second image sensor, one or more image processing modules, a display, and a thumbnail generation unit. The first image sensor generates first image data. The second image sensor generates second image data. The one or more image processing modules process one or more image data among the first image and the second image data. The display unit displays the one or more image data among the first image data and second image data processed by the one or more image processing modules. The thumbnail generation module generates thumbnail data using the one or more image data among the first image data and second image data processed by the one or more image processing modules.

The one or more image processing modules comprise a first image processing module configured to process the first image data received from the first image sensor, a second image processing module configured to process the second image data received from the second image sensor, wherein the first image processing module is formed in an Application Processor (AP).

The thumbnail generation module is formed in the application processor.

The one or more image processing modules are configured to process the one or more image data among the first image data and the second image data, and generate one or more preview data of a format displayable on the display and metadata about corresponding image data.

At a capture event, the thumbnail generation module is configured to generate thumbnail data about capture image data using one or more among one or more preview data and metadata about corresponding image data generated in the one or more image processing modules.

The electronic device may further comprising a memory, wherein the thumbnail generation module is configured to interlock the thumbnail data and the capture image data using an image acquisition time stamp comprised in the metadata or frame identification information and store the interlock result in the memory.

Figure 10:
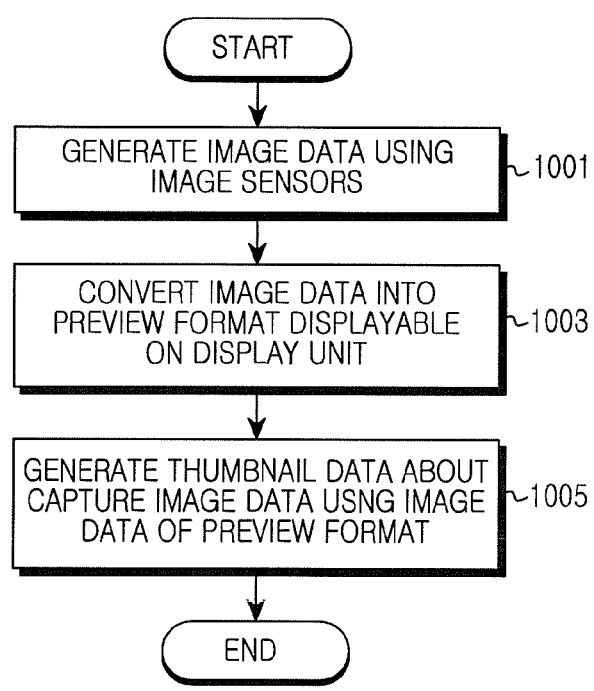
FIG. 10 is a flowchart illustrating a procedure for generating thumbnail data in an electronic device according to an embodiment of the present disclosure.

FIG. 10 is a flowchart illustrating a procedure for generating thumbnail data in an electronic device according to an embodiment of the present disclosure.

Referring to FIG. 10, in step 1001, the electronic device can generate image data using a plurality of image sensors. For example, the electronic device can generate the image data using a first image sensor located in front of the electronic device and a second image sensor located in rear of the electronic device.

When generating the image data, in step 1003, the electronic device can convert the image data into a preview format displayable on a display unit. For instance, the electronic device can convert the image data into the preview format displayable on the display unit using one or more image processing units (i.e., ISPs). For example, when referring to FIG. 2, the electronic device 100 can convert image data generated through the image sensors 130-1 to 130-N into a preview format (e.g., YUV data) displayable on the display unit 140 using the image processing unit 200. At this time, the image processing unit 200 can generate metadata about the image data converted into the preview format displayable on the display unit 140 together and store the image data and the metadata about the image data in the memory 120. For another example, when referring to FIG. 5 and FIG. 6, the electronic device 500 can convert image data generated through the first image sensor 530-1 into the preview format (e.g., YUV data) displayable on the display unit 140 using the image processing unit 600, and convert image data generated through the second image sensor 530-2 to the Nth image sensor 530-N into the preview format displayable on the display unit 140 using the external image processing units 540-1 to 540-(N−1). At this time, the image processing unit 600 and the external image processing units 540-1 to 540-(N−1) can generate metadata about the image data converted into the preview format displayable on the display unit 140 together and store the image data and the metadata about the image data in one or more memories among the first memory 520 and the second memory 550. Here, the metadata can include one or more of a frame IDentifier (ID) of the corresponding image data, an image acquisition time stamp, and image setting information (EXIF).

When converting the image data into the preview format displayable on the display unit, in step 1005, the electronic device can generate thumbnail data about capture image data using the data of the preview format. For instance, the electronic device can generate the thumbnail data using a different module separate from the image processing unit. For example, when referring to FIG. 2, the thumbnail generation unit 230 of the electronic device 100 can generate thumbnail data about capture image data using image data of a preview format and metadata of the corresponding image data stored in the memory 120. For another example, when referring to FIG. 5 and FIG. 6, the thumbnail generation unit 650 of the electronic device 500 can generate thumbnail data about capture image data using image data of a preview format and metadata of the corresponding image data stored in one or more memories among the first memory 520 and the second memory 550.

Figure 11:
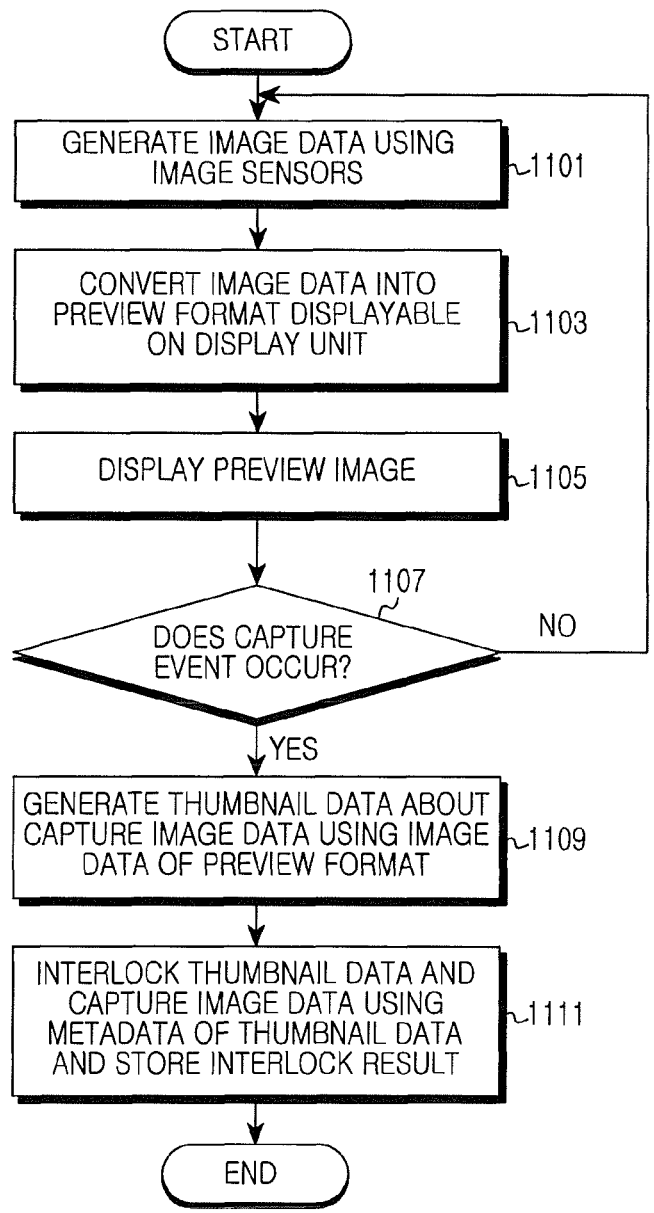
FIG. 11 is a flowchart illustrating a procedure for interlocking and storing thumbnail data and capture image data in an electronic device according to an embodiment of the present disclosure.
Figure 12A:
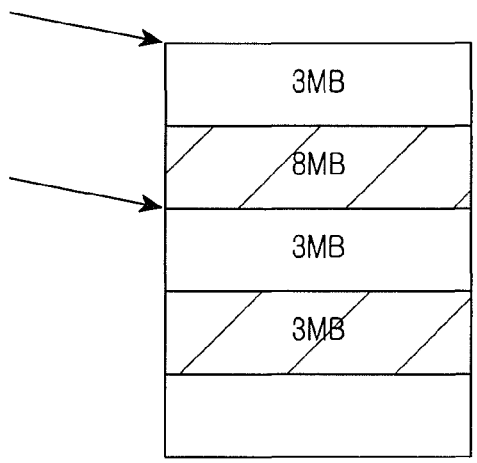
FIGS. 12A and 12B are diagrams illustrating a structure of divided and stored image data according to an embodiment of the present disclosure.
Figure 12B:
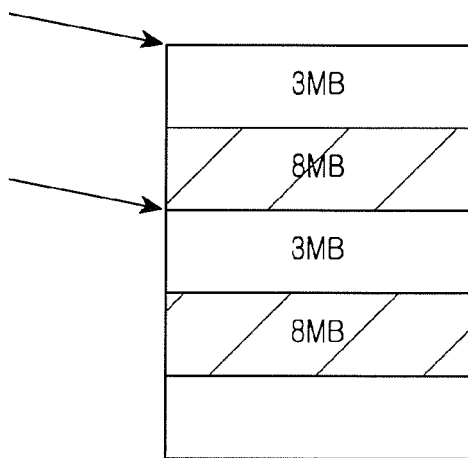

FIG. 11 is a flowchart illustrating a procedure for interlocking and storing thumbnail data and capture image data in an electronic device according to an embodiment of the present disclosure.

Referring to FIG. 11, in step 1101, the electronic device can generate image data using a plurality of image sensors. For example, the electronic device can generate the image data using a first image sensor located in front of the electronic device and a second image sensor located in rear of the electronic device.

When generating the image data, in step 1103, the electronic device can convert the image data into a preview format displayable on a display unit. For instance, the electronic device can convert the image data into the preview format displayable on the display unit using one or more image processing units (i.e., ISPs). At this time, the electronic device can store in a memory image data converted into a preview format in one or more image processing units and metadata about the corresponding image data. Here, the metadata can include one or more of a frame ID of the corresponding image data, an image acquisition time stamp, and image setting information (EXIF).

When converting the image data into the preview format displayable on the display unit, in step 1105, the electronic device can display the image data of the preview format on the display unit.

In step 1107, the electronic device can determine if a capture event takes place. For example, the electronic device can determine if an input of a hardware button corresponding to the capture event is sensed. For another example, the electronic device can determine if a selection of an icon corresponding to the capture event is sensed. For further example, the electronic device can determine if a user's gesture corresponding to the capture event is sensed.

If the capture event does not take place in step 1107, the electronic device can return to step 1101 and generate image data using the plurality of image sensors.

If the capture event occurs in step 1107, in step 1109, the electronic device can generate thumbnail data about capture image data using the image data of the preview format. For example, when a first image sensor of a low capacity is located in front of the electronic device and a second image sensor of a high capacity is located in rear thereof, the electronic device can use low-capacity image data generated through the first image sensor, as preview image data displayable on the display unit. The electronic device can convert high-capacity image data generated through the second image sensor into a preview format and generate preview image data. According to this, when the capture event takes place by a time of a processing delay of the high-capacity image data, the electronic device can recognize and synthesize as capture image data the low-capacity image data corresponding to the preview image data displayed on the display unit at a capture event occurrence time point and the high-capacity image data including an image acquisition time stamp corresponding to the capture event occurrence time point. At the time of thumbnail data generation according to the capture event, the electronic device can generate thumbnail data by synthesizing preview image data of the low-capacity image data displayed on the display unit at the capture event occurrence time point and a preview image for the high-capacity image data including the image acquisition time stamp corresponding to the capture event occurrence time stamp. For instance, the electronic device can generate the thumbnail data using a different module separate from the image processing unit.

After generating the thumbnail data, in step 1111, the electronic device can interlock the thumbnail data and the capture image data using metadata of the thumbnail data and store the interlock result. For example, the electronic device can interlock the capture image data and the thumbnail data using the image acquisition time stamp or frame identification information included in the metadata used for generating the thumbnail data, and store the interlock result in the memory.

According to an embodiment of the present disclosure, an operation method of an electronic device is provided. The method includes the operations of generating a plurality of image data using a plurality of image sensors, converting the plurality of image data into a format displayable on a display unit through one or more image processing modules, and generating thumbnail data using the image data of the displayable format converted in the image processing modules, in a other module separate from the image processing modules.

The method may further comprise, generating the plurality of image data using the plurality of image sensors connected to the electronic device, or connected with the electronic device through a wired interface or a wireless interface.

The method may further include, displaying on the display one or more image data among the image data of the displayable format converted in the image processing modules.

The converting into the displayable format include, converting first image data generated using a first image sensor among the plurality of image sensors into the format displayable on the display, using a first image processing module formed in an Application Processor (AP), and converting second image data generated using a second image sensor among the plurality of image sensors into the format displayable on the display, using a second image processing module formed separately from the AP.

The generating the thumbnail data include, the operation of generating the thumbnail data using the image data of the displayable format converted in the first image processing module and the second image processing module, in the other module comprised in the AP.

The converting into the displayable format include, processing the one or more image data among the plurality of image data using the one or more image processing modules, and generating one or more preview data of the format displayable on the display and metadata about corresponding image data.

The generating the thumbnail data include, at a capture event, generating thumbnail data about capture image data using one or more among the one or more preview data and the metadata about corresponding image data generated in the one or more image processing modules, in the other module.

The method may further include, interlocking the thumbnail data and the capture image data using an image acquisition time stamp comprised in the metadata or frame identification information, and storing the interlock result in a memory.

According to an embodiment of the present disclosure, an electronic device includes one or more image sensors and an interface. The one or more image sensors generate image data. The interface processes the image data generated in the one or more image sensors. The interface transmits the image data to one or more modules. The one or more modules change a format of the image data based on an image data processing method of a corresponding module.

The interface comprises an interface of a Mobile Industry Processor Interface (MIPI) method.

The one or more modules comprise one or more of an Image Signal Processor (ISP), a Video Preprocessing (VPE) module, a Video Front-End (VFE) module, and a preview image generation module.

When the format of the image data is changed based on the image data processing methods of the one or more modules, the ISP generates metadata comprising information about the format change of the image data.

The metadata comprises one or more of frame identification information of the image data, an image acquisition time stamp, and image setting information (Exchangeable Image File Format (EXIF)).

The ISP is configured to generate thumbnail data of the image data generated in the one or more image sensors, using the metadata.

The interface is configured to divide the image data into a plurality of pieces based on a transmission capacity of the interface and transmit the divided image data to the one ore modules.

Figure 13:
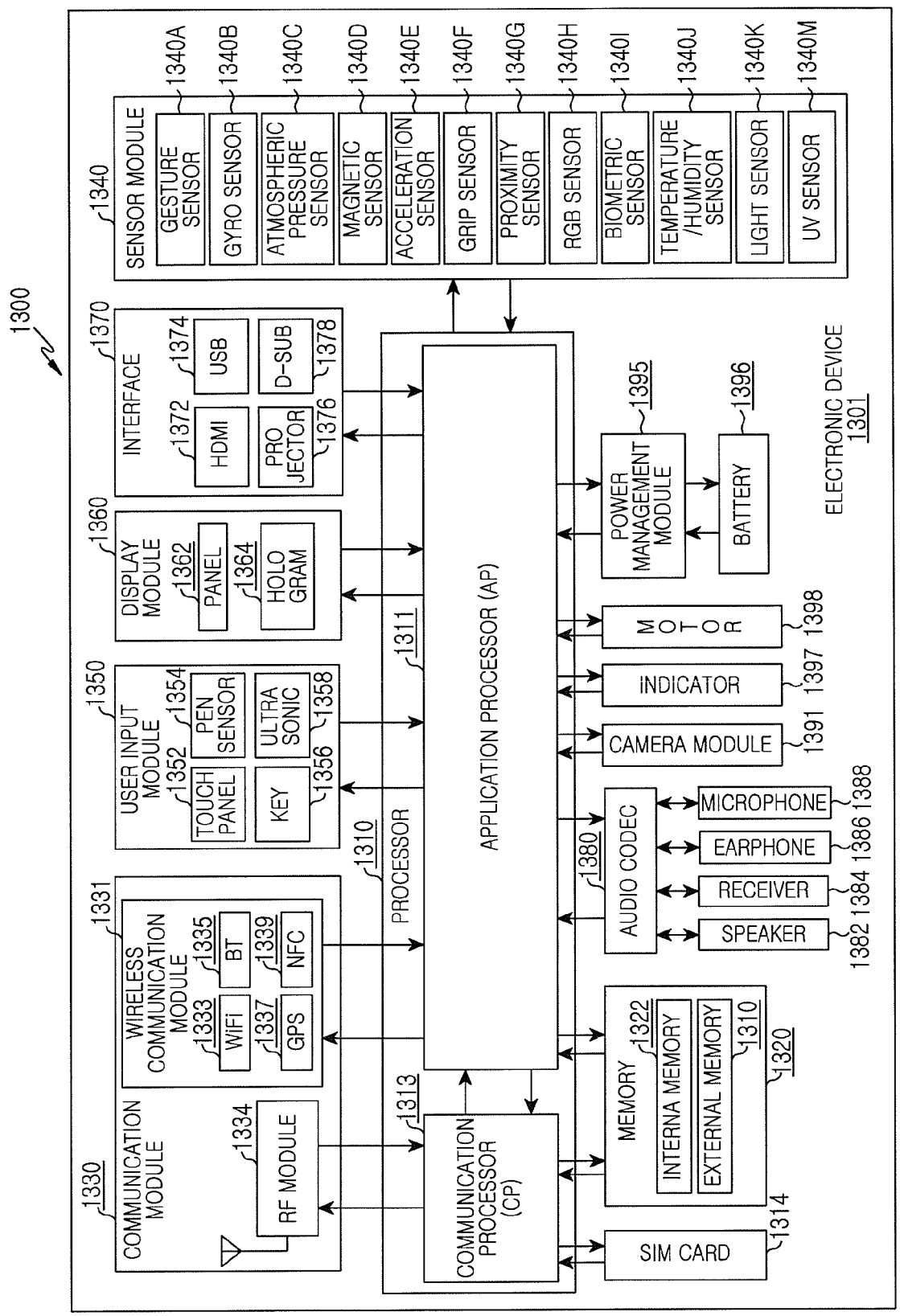
FIG. 13 is a block diagram illustrating an electronic device according to a further embodiment of the present disclosure.

FIG. 13 is a block diagram illustrating an electronic device according to a further embodiment of the present disclosure. In the following description, the electronic device 1300 can construct the whole or part of the electronic device 101 illustrated in FIG. 1, for example.

Referring to FIG. 13, the electronic device 1300 can include one or more processors 1310, a SIM card 1314, a memory 1320, a communication module 1330, a sensor module 1340, an input module 1350, a display module 1360, an interface 1370, an audio module 1380, a camera module 1391, a power management module 1395, a battery 1396, an indicator 1397, or a motor 1398.

The processor 1310 (e.g., the processor 120) can include one or more APs 1311 or one or more Communication Processors (CPs) 1313. In FIG. 13, it is illustrated that the AP 1311 and the CP 1313 are included within the processor 1310, but the AP 1311 and the CP 1313 can be included within different IC packages, respectively. According to one embodiment, the AP 1311 and the CP 1313 can be included within one IC package.

The AP 1311 can drive an operating system or application program and control a plurality of hardware or software constituent elements connected to the AP 1311, and can perform processing and operations of various data including multimedia data. The AP 1311 can be implemented, for example, as a System on Chip (SoC). According to one embodiment, the processor 1310 can further include a Graphics Processing Unit (GPU) (not shown).

The CP 1313 can perform a function of managing a data link and converting a communication protocol in communication between the electronic device 1300 (e.g., the electronic device 101) and other electronic devices (e.g., the electronic device 102, the electronic device 104, or the server 106) connected to a network. The CP 1313 can be implemented, for example, as an SoC. According to one embodiment, the CP 1313 can perform at least a part of a multimedia control function. The CP 1313 can perform discrimination and authentication of an electronic device within a communication network using a subscriber identity module (e.g., the SIM card 1314). Also, the CP 1313 can provide services of a voice call, a video call, a text message, packet data or the like to a user.

Also, the CP 1313 can control data transmission/reception of the communication module 1330. In FIG. 13, constituent elements such as the CP 1313, the power management module 1395, the memory 1320 or the like are illustrated as constituent elements separate from the AP 1311 but, according to one embodiment, the AP 1311 can be implemented to include at least some (e.g., the CP 1313) of the aforementioned constituent elements.

According to one embodiment, the AP 1311 or the CP 1313 can load to a volatile memory an instruction or data received from a nonvolatile memory connected to each or at least one of other constituent elements, and process the loaded instruction or data. Also, the AP 1311 or the CP 1313 can store data received from at least one of other constituent elements or generated by at least one of the other constituent elements, in the nonvolatile memory.

The SIM card 1314 can be a card including the subscriber identity module, and can be inserted into a slot provided in a specific location of the electronic device. The SIM card 1314 can include unique identification information (e.g., an Integrated Circuit Card ID (ICCID)) or subscriber information (e.g., International Mobile Subscriber Identity (IMSI)).

The memory 1320 (e.g., the memory 130) can include an internal memory 1322 or an external memory 1324. The internal memory 1322 can include at least one of, for example, a volatile memory (e.g., a DRAM, a SRAM, a SDRAM and the like) and a nonvolatile memory (e.g., OTPROM, a PROM, an EPROM, an EEPROM, a mask ROM, a flash ROM, a NAND flash memory, a NOR flash memory and the like). According to one embodiment, the internal memory 822 can be an SSD. The external memory 1324 can further include a flash drive, for example, CF, SD, micro-SD, Mini-SD, xD, a memory stick or the like. The external memory 1324 can be functionally connected with the electronic device 1300 through various interfaces. According to one embodiment, the electronic device 1300 can further include a storage device (or storage media) such as a hard disk.

The communication module 1330 (e.g., the communication interface 160) can include a wireless communication module 1331 or a Radio Frequency (RF) module 1334. The wireless communication module 1331 can include, for example, WiFi 1333, BT 1335, GPS 1337 or NFC 1339. For example, the wireless communication module 1331 can provide a wireless communication function using a radio frequency. Additionally or alternatively, the wireless communication module 1331 can include a network interface (e.g., a LAN card), a modem or the like for connecting the electronic device 1300 with a network (e.g., the Internet, a LAN, a WAN, a telecommunication network, a cellular network, a satellite network, a POTS or the like).

The RF module 1334 can take charge of transmission/reception of data, for example, transmission/reception of an RF signal. The RF module 1334 can include, though not illustrated, a transceiver, a Pluggable Authentication Module (PAM), a frequency filter, a Low Noise Amplifier (LNA) or the like, for example. Also, the RF module 1334 can further include components for transmitting/receiving electromagnetic wave on a free space in wireless communication, for example, a conductor, a conductive line or the like.

The sensor module 1340 can measure a physical quantity, sense an activation state of the electronic device 1300, and convert the measured or sensed information into an electrical signal. The sensor module 1340 can include, for example, at least one of a gesture sensor 1340-A, a gyro sensor 1340-B, a pressure sensor 1340-C, a magnetic sensor 1340-D, an accelerator sensor 1340-E, a grip sensor 1340-F, a proximity sensor 1340-G, a color sensor 1340-H (e.g., an RGB sensor), a biological sensor 1340-I, a temperature/humidity sensor 1340-J, a light sensor 1340-K, and a Ultraviolet (UV) sensor 1340-M. Additionally or alternatively, the sensor module 1340 can include, for example, an odor sensor (not shown), an Electromyography (EMG) sensor (not shown), an Electroencephalography (EEG) sensor (not shown), an Electrocardiograph (ECG) sensor (not shown), an Infrared (IR) sensor (not shown), an iris sensor (not shown), a fingerprint sensor (not shown) or the like. The sensor module 1340 can further include a control circuit for controlling at least one or more sensors belonging to therein.

The input module 1350 can include a touch panel 1352, a (digital) pen sensor 1354, a key 1356 or an ultrasonic wave input device 1358. The touch panel 1352 can recognize a touch input, for example, in at least one method among a capacitive method, a pressure sensitive method, an infrared method, and an ultrasonic wave method. Also, the touch panel 1352 can further include a control circuit. In the capacitive method, physical contact or proximity recognition is possible. The touch panel 1352 can further include a tactile layer. In this case, the touch panel 1352 can provide a tactile response to a user.

The (digital) pen sensor 1354 can be implemented, for example, in the same or similar method as receiving a user's touch input, or using a separate recognizing sheet. The key 1356 can include, for example, a physical button, an optical key, a keypad, or a touch key. The ultrasonic wave input device 1358, which is a device capable of sensing a sound wave by a microphone (e.g., microphone 1388) and confirming data in an electronic device, enables wireless recognition through an input tool generating an ultrasonic wave signal. According to one embodiment, the electronic device 1300 can receive a user input from an external device (e.g., a network, a computer, or a server) connected to this using the communication module 1330.

The display module 1360 (e.g., the display 150) can include a panel 1362, a hologram 1364, or a projector 1366. The panel 1362 can be, for example, a Liquid Crystal Display (LCD), an Active-Matrix Organic Light-Emitting Diode (AMOLED), or the like. The panel 1362 can be implemented, for example, to be flexible, transparent, or wearable. The panel 1362 can be constructed as one module with the touch panel 1352. The hologram 1364 can represent a three-dimensional image in the air using interference of light. The projector 1366 can project light to a screen and display a video. The screen can be located, for example, inside or outside the electronic device 100. According to one embodiment, the display module 1360 can further include a control circuit for controlling the panel 1362, the hologram 1364, or the projector 1366.

The interface 1370 can include, for example, an HDMI 1372, a USB 1374, an optical communication terminal 1376, or a D-subminiature (D-sub) 1378. The interface 1370 can include, for example, the communication interface 160 illustrated in FIG. 1. Additionally or alternatively, the interface 1370 can include, for example, Mobile High-definition Link (MHL) (not shown), Secure Digital/Multi Media Card (SD/MMC) (not shown), or Infrared Data Association (IrDA) (not shown).

The audio module 1380 can convert sound and an electric signal interactively. At least some constituent elements of the audio module 1380 can be included, for example, in the input/output interface 140 illustrated in FIG. 1. The audio module 1380 can process, for example, sound information inputted or outputted through a speaker 1382, a receiver 1384, an earphone 1386, a microphone 1388, or the like.

The camera module 1391 is a device capable of taking a still picture and a moving picture. According to one embodiment, the camera module 1391 can include one or more image sensors (e.g., a front sensor or rear sensor), a lens (not shown), an ISP (not shown), or a flash (not shown) (e.g., an LED or a xenon lamp).

The power management module 1395 can manage power of the electronic device 1300. Though not illustrated, the power management module 1395 can include, for example, a Power Management Integrated Circuit (PMIC), a charging Integrated Circuit (IC), and a battery or fuel gauge.

The PMIC can be mounted, for example, within an integrated circuit or an SoC semiconductor. A charging method can be divided into wired and wireless. The charging IC can charge a battery, and can prevent the inflow of overvoltage or overcurrent from an electric charger. According to one embodiment, the charging IC can include a charging IC of at least one of a wired charging method and a wireless charging method. As the wireless charging method, there are, for example, a magnetic resonance method, a magnetic induction method, an electromagnetic method and the like. The charging IC can be added with a supplementary circuit for wireless charging, for example, a coil loop, a resonance circuit, a rectifier circuit or the like.

The battery gauge can measure, for example, a level of the battery 1396 and a charging voltage, current or temperature. The battery 1396 can store and generate electricity, and can supply a power source to the electronic device 1300 using the stored or generated electricity. The battery 1396 can include, for example, a chargeable cell or a solar cell.

The indicator 1397 can display a specific state of the electronic device 1300 or a part thereof, for example, a booting state, a message state, a charging state or the like. The motor 1398 can convert an electrical signal into a mechanical vibration. Though not illustrated, the electronic device 1300 can include a processing device (e.g., a GPU) for mobile TV support. The processing device for mobile TV support can process, for example, standard media data of Digital Multimedia Broadcasting (DMB), Digital Video Broadcasting (DVB), a media flow or the like.

The aforementioned constituent elements of an electronic device according to an embodiment of the present disclosure can be each composed of one or more components, and a name of a corresponding constituent element can be different according to the kind of the electronic device. The electronic device according to the present disclosure can include at least one of the aforementioned constituent elements, and can omit some constituent elements or further include additional other constituent elements. Also, some of the constituent elements of the electronic device according to the present disclosure are combined and constructed as one entity, thereby being able to identically perform the functions of the corresponding constituent elements before combination.

As described above, embodiments of the present disclosure can improve an image processing speed of an image processing unit (i.e., ISP) by interlocking thumbnail data generated using a processor different from the image processing unit and capture data and storing the interlock result in an electronic device.

The embodiments of the present disclosure can improve a processing speed for thumbnail data by generating the thumbnail data using metadata generated in the image processing unit in a different processor of an electronic device. Here, the metadata can include a frame identifier of image data, an image acquisition time stamp, focus information, image setting information (EXIF), flash information, and the like.

While the present disclosure has been shown and described with reference to certain preferred embodiments thereof, it will be understood by those skilled in the art that operations of an electronic device can be changed, merged or reused and various changes such as omission and the like can be made therein without departing from the spirit and scope of the present disclosure. Therefore, the spirit and scope of the present disclosure should not be limited and defined to the described embodiments and should be defined by not only the appended claims but also equivalents to the appended claims.

What is claimed is:

1. An electronic device comprising:
   a first image sensor configured to generate first image data;
   a second image sensor configured to generate second image data;
   a display configured to display an image; and
   one or more processors configured to:
      generate a preview image by processing the first image data;
      display the preview image on the display; and
      in response to an occurrence of a capture event, generate thumbnail data using the first image data and the second image data.

2. The electronic device of claim 1, wherein, of the first image data and the second image data, the preview image for display on the display is generated by processing only the first image data.

3. The electronic device of claim 1, wherein the one or more processors are configured to, in response to the occurrence of the capture event, generate capture image data using the first image data and the second image data.

4. The electronic device of claim 1, wherein the thumbnail data includes an image of a resolution less than the preview image.

5. The electronic device of claim 1, wherein the one or more processors comprises one or more first processors configured to generate the preview image by processing the first image data and display the preview image on the display, and a second processor configured to generate the thumbnail data.

6. The electronic device of claim 1, wherein the one or more processors are configured to store the first image data and the second image data in a memory of the electronic device.

7. A method in an electronic device, the method comprising:
   generating first image data using a first image sensor;
   generating second image data using a second image sensor;
   generating a preview image by processing the first image data;
   displaying the preview image on a display of the electronic device; and
   in response to an occurrence of a capture event, generating thumbnail data using the first image data and the second image data.

8. The method of claim 7, further comprising generating capture image data using the first image data and the second image data.

9. The method of claim 7, further comprising storing the first image data and the second image data in a memory of the electronic device.

* * * * *